(12) United States Patent
Lee et al.

(10) Patent No.: US 11,731,413 B2
(45) Date of Patent: Aug. 22, 2023

(54) ATTACHING DEVICE AND INTERMEDIATE MECHANISM THEREOF, AND ATTACHING METHOD

(71) Applicant: MIRLE AUTOMATION CORPORATION, Hsinchu (TW)

(72) Inventors: Yen-Dao Lee, Hsinchu (TW); Chun-Chieh Lu, Hsinchu (TW); Shih-Chun Chen, Hsinchu (TW)

(73) Assignee: MIRLE AUTOMATION CORPORATION, Hsinchu (TW)

( * ) Notice: Subject to any disclaimer, the term of this patent is extended or adjusted under 35 U.S.C. 154(b) by 0 days.

(21) Appl. No.: 17/429,433

(22) PCT Filed: Sep. 30, 2019

(86) PCT No.: PCT/CN2019/109458
§ 371 (c)(1),
(2) Date: Feb. 2, 2022

(87) PCT Pub. No.: WO2021/062633
PCT Pub. Date: Apr. 8, 2021

(65) Prior Publication Data
US 2022/0161538 A1 May 26, 2022

(51) Int. Cl.
*B32B 37/10* (2006.01)
*B32B 7/12* (2006.01)
(Continued)

(52) U.S. Cl.
CPC ............... *B32B 37/10* (2013.01); *B32B 7/12* (2013.01); *B32B 37/0046* (2013.01);
(Continued)

(58) Field of Classification Search
CPC . B32B 37/10; B32B 37/1009; B32B 37/0046; B32B 37/003
See application file for complete search history.

(56) References Cited

U.S. PATENT DOCUMENTS 5,352,629 A 10/1994 Paik et al.
5,930,654 A 7/1999 Tohyama et al.
(Continued)

FOREIGN PATENT DOCUMENTS

CN 110014717 A 7/2019
EP 1244939 A1 10/2002
(Continued)

OTHER PUBLICATIONS

China Patent Office, Office action dated Jan. 18, 2022 for CN application No. 201910937488.3.
(Continued)

*Primary Examiner* — Carson Gross
(74) *Attorney, Agent, or Firm* — Li & Cai Intellectual Property (USA) Office

(57) ABSTRACT

An attaching apparatus, an intermediary mechanism thereof, and an attaching method are provided. The intermediary mechanism is provided for being selectively arranged between a pressing mechanism and a carrying mechanism. The intermediary mechanism includes a frame, a deformable sheet fixed on the frame, and an adhesive layer disposed on the deformable sheet. The frame is provided for being fastened to one of the pressing mechanism and the carrying mechanism. The adhesive layer is provided for adhering at least one attaching object onto one side of the deformable sheet facing the carrying mechanism. The deformable sheet is configured to be gradually deformed toward the carrying mechanism by being pressed with the pressing mechanism, so that the at least one attaching object is abutted against an attached object on the carrying mechanism.

20 Claims, 19 Drawing Sheets

(51) Int. Cl.
*B32B 37/00* (2006.01)
*B32B 37/12* (2006.01)

(52) U.S. Cl.
CPC ........ *B32B 37/025* (2013.01); *B32B 37/1009* (2013.01); *B32B 37/12* (2013.01); *B32B 2309/12* (2013.01); *B32B 2457/20* (2013.01)

(56) References Cited

U.S. PATENT DOCUMENTS

| 7,658,604 | B1 | 2/2010 | Yang et al. |
| 2010/0015271 | A1 | 1/2010 | Yang et al. |

FOREIGN PATENT DOCUMENTS

| JP | 10233430 | A | | 9/1998 |
| JP | 2004153159 | A | | 5/2004 |
| JP | 2009152424 | A | | 7/2009 |
| JP | 2013114186 | A | | 6/2013 |
| JP | 2015130380 | A | | 7/2015 |
| KR | 101927801 | | * | 2/2019 |
| KR | 101927801 | B1 | | 2/2019 |
| TW | 311264 | B | | 7/1997 |
| TW | 201002534 | A | | 1/2010 |
| TW | 201408488 | A | | 3/2014 |
| TW | 201713508 | A | | 4/2017 |

OTHER PUBLICATIONS

WIPO, International Search Report dated Apr. 15, 2020.
European Patent Office, European Search Report on European Patent Application No. EP20155797, dated Jul. 17, 2020.
WIPO, International Preliminary Report On Patentability dated Apr. 14, 2022 for PCT application No. PCT/CN2019/109458.

* cited by examiner

ATTACHING DEVICE AND INTERMEDIATE MECHANISM THEREOF, AND ATTACHING METHOD

FIELD OF THE DISCLOSURE

The present disclosure relates to an attaching apparatus, and more particularly to an intermediary mechanism, an attaching apparatus using the same, and an attaching method.

BACKGROUND OF THE DISCLOSURE

A conventional attaching apparatus includes a carrying platform and a pressing mechanism, and is used to fix an attaching object onto an attached object by moving the pressing mechanism. However, since diverse types of attachment have been developed to date, the structural design of the conventional attaching apparatus can no longer meet current attaching requirements.

SUMMARY OF THE DISCLOSURE

In response to the above-referenced technical inadequacies, the present disclosure provides an attaching apparatus, an intermediary mechanism thereof, and an attaching method to effectively improve the issues associated with conventional attaching apparatus.

In one aspect, the present disclosure provides an attaching apparatus, which includes a carrying mechanism, a pressing mechanism, and an intermediary mechanism. The carrying mechanism includes a carrying surface for fixing an attached object thereupon. The pressing mechanism corresponds in position to the carrying mechanism. The pressing mechanism defines a filled space arranged in an inner side thereof, and includes a filling opening in spatial communication with the filled space and a pressing member that defines at least part of the filled space. The pressing mechanism and the carrying mechanism are relatively movable between a seal position and an open position. When the pressing mechanism and the carrying mechanism are at the seal position, the pressing mechanism and the carrying mechanism jointly define a work space. The intermediary mechanism is selectively arranged between the carrying surface and the pressing member. The intermediary mechanism includes a frame, a deformable sheet, and an adhesive layer. The frame is fastened to one of the carrying mechanism and the pressing mechanism. The deformable sheet is fixed to the frame. The adhesive layer is disposed on the deformable sheet. The adhesive layer is configured to adhere at least one attaching object onto a side of the deformable sheet facing the carrying surface. When the pressing mechanism and the carrying mechanism are at the seal position, the attached object is fixed on the carrying surface, and the at least one attaching object is adhered onto the deformable sheet, the filled space of the pressing mechanism is configured to be filled with a fluid through the filling opening, and the filled space is gradually expanded toward the deformable sheet to force the pressing member to gradually press the deformable sheet, so that the deformable sheet is gradually deformed toward the carrying surface to press the at least one attaching object onto the attached object.

In one aspect, the present disclosure provides an intermediary mechanism of an attaching apparatus for being selectively arranged between a pressing mechanism and a carrying mechanism. The intermediary mechanism includes a frame, a deformable sheet, and an adhesive layer. The frame is configured to be fastened to one of the carrying mechanism and the pressing mechanism. The deformable sheet is fixed to the frame. The adhesive layer is disposed on the deformable sheet. The adhesive layer is configured to adhere at least one attaching object onto a side of the deformable sheet facing the carrying mechanism. The deformable sheet is configured to be pressed by the pressing mechanism, so that the deformable sheet is gradually deformable toward the carrying mechanism to press the at least one attaching object onto an attached object that is disposed on the carrying mechanism.

In one aspect, the present disclosure provides an attaching method using the attaching apparatus. The attaching method includes a preparing step, a placing step, a sealing step, and attaching step. The preparing step is implemented by disposing at least one attaching object onto the deformable sheet through the adhesive layer, and disposing an attached object onto the carrying surface of the carrying mechanism. The placing step is implemented by disposing the intermediary mechanism between the pressing mechanism and the carrying mechanism that are both at the open position. The frame of the intermediary mechanism is fastened to one of the carrying mechanism and the pressing mechanism, and the at least one attaching object faces the carrying surface of the carrying mechanism. The sealing step is implemented by relatively moving the pressing mechanism and the carrying mechanism so as to be at the seal position. The intermediary mechanism and the at least one attaching object are respectively arranged adjacent to the pressing member and the attached object. The attaching step is implemented by filling a fluid into the filled space of the pressing mechanism through the filling opening, so that the filled space is gradually expanded toward the deformable sheet to force the pressing member to gradually press the deformable sheet, and then the deformable sheet is gradually deformed toward the carrying surface to press the at least one attaching object onto the attached object.

Therefore, the attaching apparatus and the attaching method of the present disclosure can be used to accurately attach the attaching object onto the attached object by using the intermediary mechanism to cooperate with the carrying mechanism and the pressing mechanism, thereby effectively preventing the attached object from being damaged. Moreover, the attaching apparatus and the attaching method of the present disclosure can be used to attach the attaching object onto the attached object in a flat connection or a curved connection.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
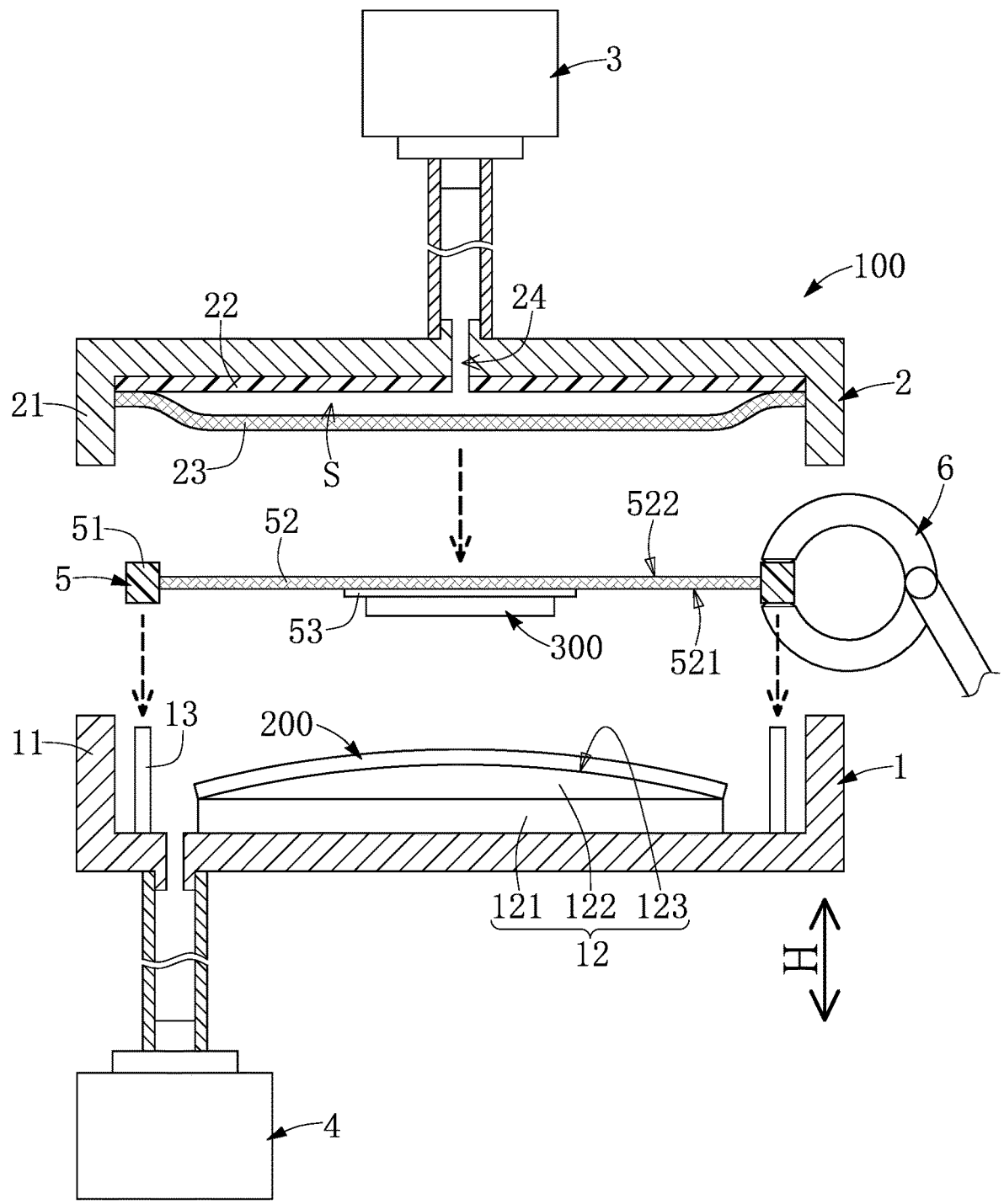
FIG. 1 is a schematic view showing an attaching apparatus at an open position according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 10, a first embodiment of the present disclosure provides an attaching apparatus 100 and an attaching method using the same for attaching (or fixing) an attaching object 300 onto an attached object 200. In the present embodiment, the attached object 200 can be a curved glass, and the attaching object 300 can be a display, but the present disclosure is not limited thereto. For example, in other embodiments of the present disclosure, the attached object 200 can be a flat structure, and the number of the attaching object 300 can be more than one.

In order to clearly describe the present embodiment, the following description describes the structure of the attaching apparatus 100, and then describes the attaching method using the attaching apparatus 100. As shown in FIG. 1, the attaching apparatus 100 in the present embodiment includes a carrying mechanism 1, a pressing mechanism 2 corresponding in position to the carrying mechanism 1, a filling mechanism 3 connected to the pressing mechanism 2, a suction mechanism 4 connected to the carrying mechanism 1, an intermediary mechanism 5 selectively arranged between the carrying mechanism 1 and the pressing mechanism 2, and a transferring mechanism 6 arranged outside of the pressing mechanism 2 and the carrying mechanism 1.

It should be noted that the attaching apparatus 100 in the present embodiment includes the above components, but the components can be added or omitted according to design requirements. For example, in other embodiments of the present disclosure, at least one of the suction mechanism 4, the filling mechanism 3, and the transferring mechanism 6 can be omitted; or, the position of the carrying mechanism 1 and the position of the pressing mechanism 2 can be exchanged. Moreover, the attaching apparatus 100 can further include a pre-adhesive alignment mechanism 8 for implementing position read or compensation by an optical manner. The following description describes the structure and connection relationship of the components of the attaching apparatus 100.

Figure 2:
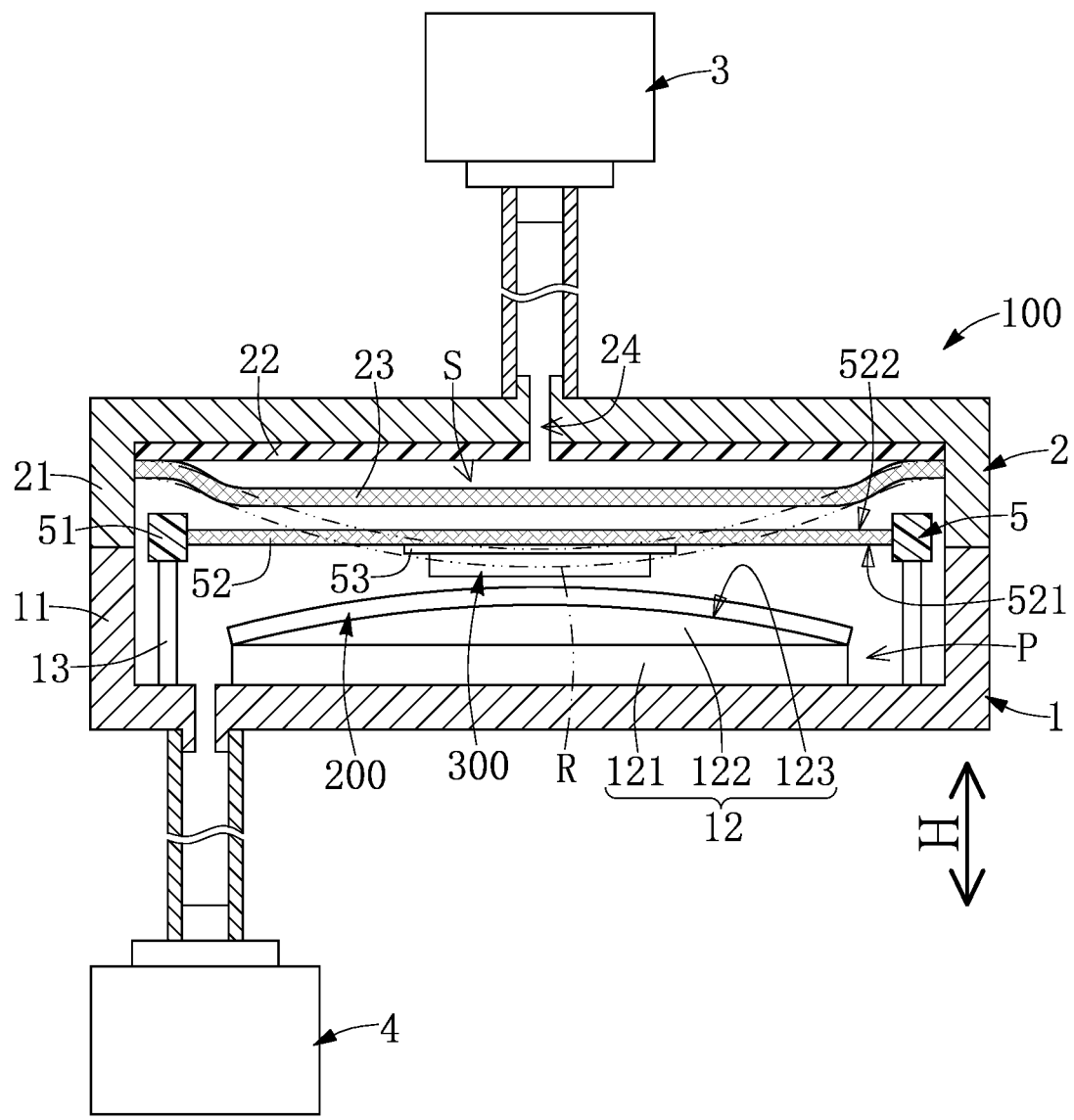
FIG. 2 is a schematic view showing the attaching apparatus at a seal position according to the first embodiment of the present disclosure.

As shown in FIG. 1 and FIG. 2, the carrying mechanism 1 includes a first chamber 11, a carrying platform 12 arranged in the first chamber 11, and a support 13 arranged in the first chamber 11. The carrying platform 12 includes a carrying surface 123 for fixing an attached object 200 thereupon (e.g., the attached object 200 can be fixed on the carrying surface 123 by a vacuum absorption or an adhesive manner). Moreover, the carrying surface 123 can be coated with a lubricating layer for preventing the attached object 200 from being scratched. In the present embodiment, the carrying surface 123 is a curved surface corresponding in shape to the attached object 200, but the present disclosure is not limited thereto.

That is to say, the carrying surface 123 of the present disclosure can be adjusted or changed according to the shape of the attached object 200. For example, in other embodiments of the present disclosure, the carrying surface 123 can be a flat surface or an irregular surface. Specifically, the carrying platform 12 can include a platform 121 and a mold 122 that is detachably mounted on the platform 121. The mold 122 has the carrying surface 123. Accordingly, the shape of the mold 122 can be changed according to the type of the attached object 200.

Moreover, the support 13 in the present embodiment is arranged outside of the carrying platform 12, and the support 13 has a positioning structure (not shown) arranged on a top thereof for fixing (or positioning) the intermediary mechanism 5. In addition, the fixing manner of the support 13 and the intermediary mechanism 5 can be adjusted or changed according to design requirements, and the present disclosure is not limited thereto. Furthermore, the top of the support 13 and the carrying surface 123 are spaced apart from each other by a predetermined distance along a height direction H, so that when the intermediary mechanism 5 is fixed to the support 13, the intermediary mechanism 5 or any object on the intermediary mechanism 5 can be avoided to touch the attached object 200 that is fixed on the carrying platform 12.

As shown in FIG. 1 and FIG. 2, the pressing mechanism 2 in the present embodiment includes a second chamber 21, a substrate 22 arranged in the second chamber 21, and a pressing member 23 that is fixed to the substrate 22 and is arranged in the second chamber 21. In the present embodiment, the substrate 22 and the pressing member 23 of the pressing mechanism 2 surroundingly define a filled space S therein (i.e., the pressing member 23 defines at least part of the filled space S), and the second chamber 21 and the substrate 22 of the pressing mechanism 2 can be formed with a filling opening 24 that is in spatial communication with the filled space S.

Moreover, the filling mechanism 3 is arranged outside of the carrying mechanism 1 and the pressing mechanism 2, and the filling mechanism 3 is connected to the filling opening 24 of the pressing mechanism 2. Accordingly, the filling mechanism 3 is configured to selectively fill a fluid (e.g., gas or liquid) into the filled space S through the filling opening 24, so that the filled space S and the pressing member 23 can be gradually expanded.

Figure 3:
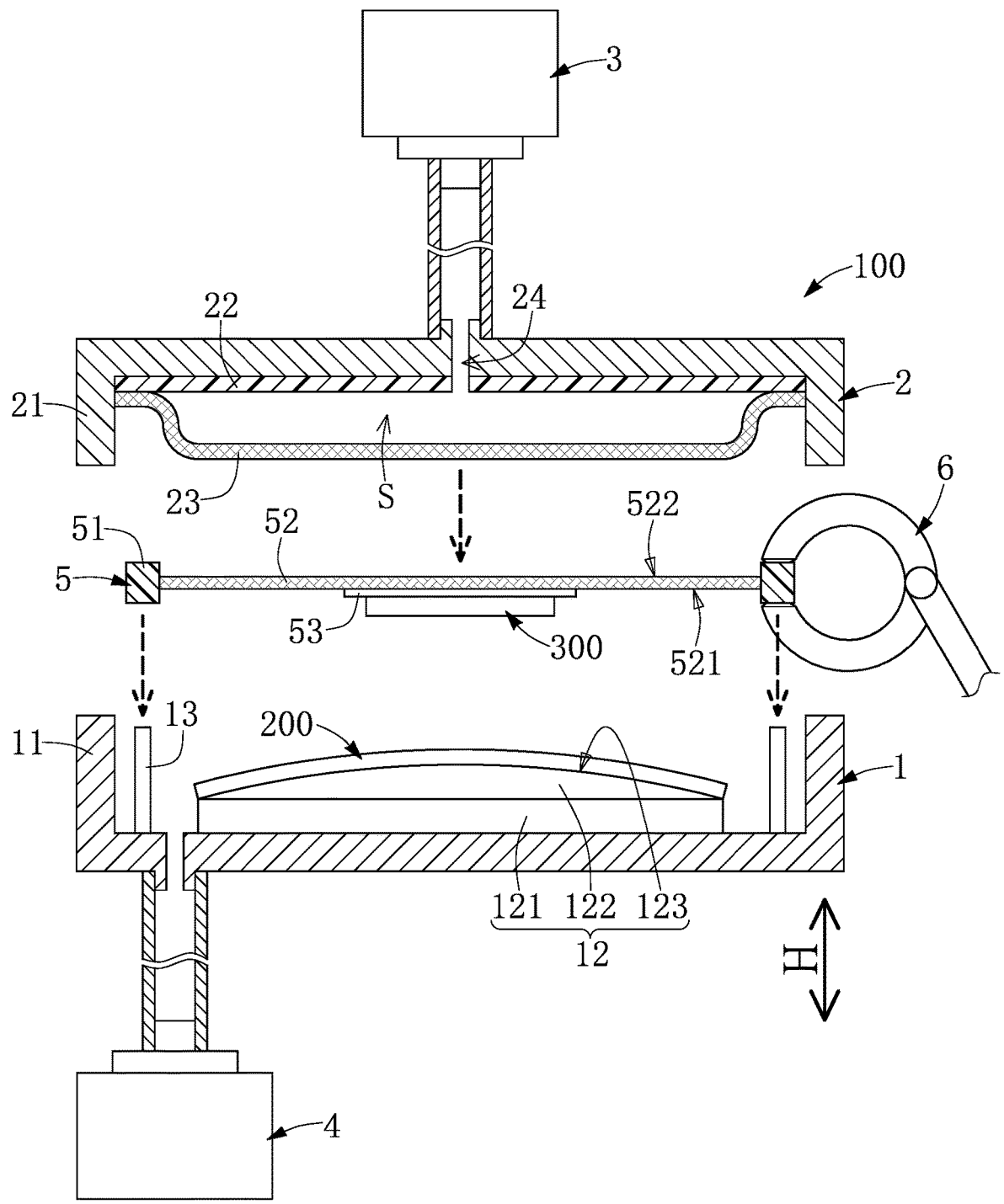
FIG. 3 is a schematic view showing a pressing member of the attaching apparatus made by a solid flexible material according to the first embodiment of the present disclosure.

It should be noted that the material of the pressing member 23 can be adjusted or changed according to design requirements, and the shape of the pressing member 23 is not limited to the figures of the present embodiment. For example, in the expanding process of the filled space S, the shape of the pressing member 23 can be changed (e.g., the pressing member 23 shown in FIG. 1 is made by a soft flexible material, such as a leather), or the shape of the pressing member 23 can be substantially maintained (e.g., the pressing member 23 shown in FIG. 3 is made by a solid flexible material, such as a leather formed with a plastic layer). In addition, in other embodiments of the present disclosure, the pressing member 23 can have a plastic block arranged therein, so that the shape of the pressing member 23 can be changed in a predetermined range.

In the present embodiment, the substrate 22 and the pressing member 23 can be detachably assembled in the second chamber 21, so that the substrate 22 and the pressing member 23 of the pressing mechanism 2 can be formed with different configurations according to design requirements, but the present disclosure is not limited thereto. For example, in other embodiments of the present disclosure, the substrate 22 and the pressing member 23 can be undetachably fixed to the second chamber 21; or, the pressing mechanism 2 can be provided without the substrate 22, the pressing member 23 is directly fixed to the second chamber 21, and the pressing member 23 and the second chamber 21 jointly define the filled space S, in which the second chamber 21 has the filling opening 24 in spatial communication with the filled space S. That is to say, the filled space S in the present embodiment is spatially communicated with an external space only through the filling opening 24.

Figure 4:
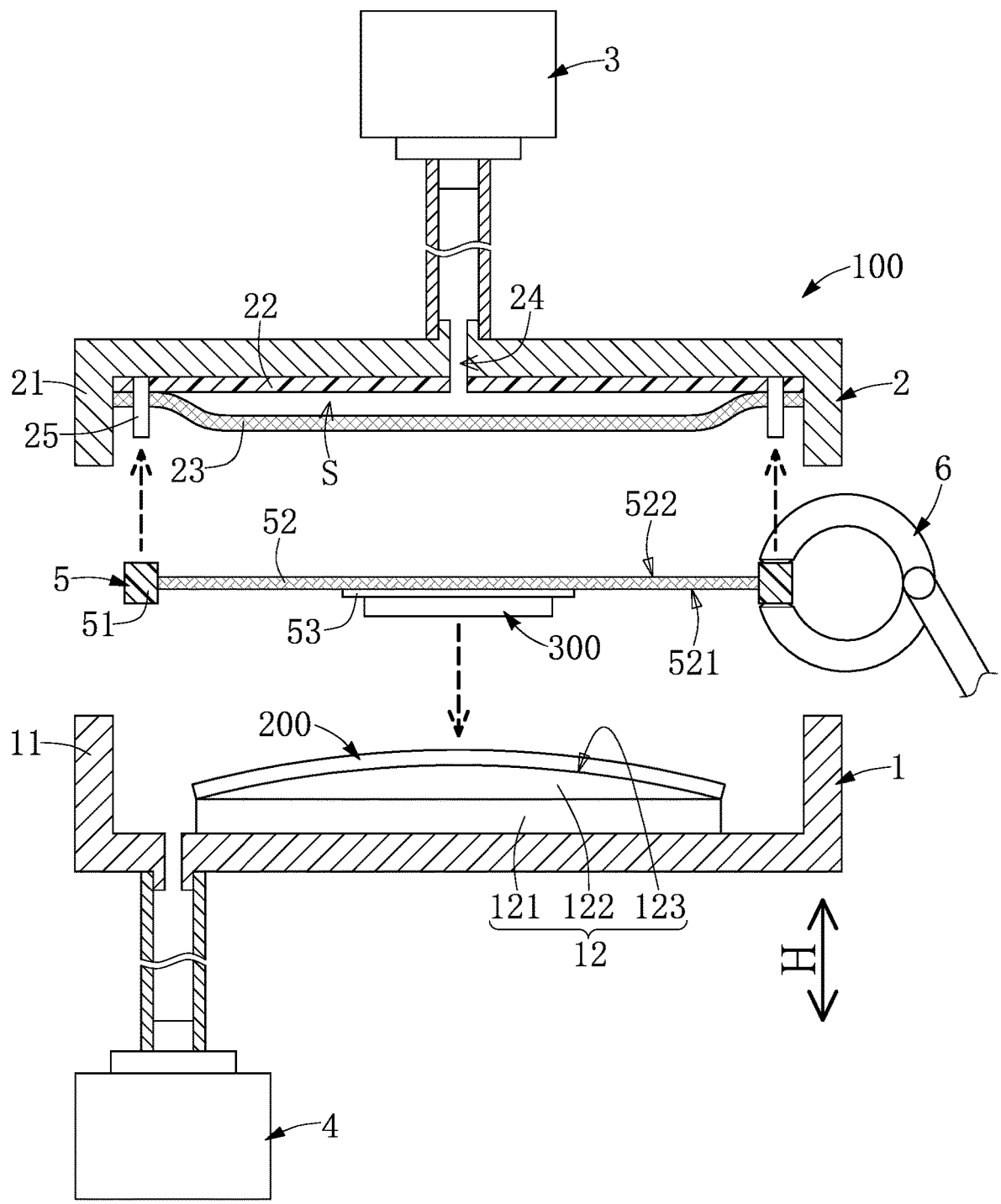
FIG. 4 is a schematic view showing a support of the attaching apparatus disposed on a pressing mechanism according to the first embodiment of the present disclosure.

In addition, the support 13 of the attaching apparatus 100 shown in FIG. 1 is arranged in the carrying mechanism 1, but the present disclosure is not limited thereto. For example, as shown in FIG. 4, the carrying mechanism 1 can be provided without the support 13, and the pressing mechanism 2 includes a support 25 arranged in the second chamber 21 and arranged outside of the pressing member 23. The support 25 has a positioning structure (not shown) arranged on a bottom thereof for fixing (or positioning) the intermediary mechanism 5. Specifically, the bottom of the support 25 and the carrying surface 123 are spaced apart from each other by a predetermined distance along the height direction H, so that when the intermediary mechanism 5 is fixed to the support 25, the intermediary mechanism 5 or any object on the intermediary mechanism 5 can be avoided to touch the pressing member 23. Accordingly, the intermediary mechanism 5 in the present embodiment can be fixed to one of the carrying mechanism 1 and the pressing mechanism 2.

The pressing mechanism 2 and the carrying mechanism 1 are relatively movable between a seal position (shown in FIG. 2) and an open position (shown in FIG. 1). In other words, at least one of the pressing mechanism 2 and the carrying mechanism 1 is movable substantially along the height direction H. When the pressing mechanism 2 and the carrying mechanism 1 are at the open position, the first chamber 11 and the second chamber 21 are spaced apart from each other, so that the intermediary mechanism 5 can be selectively moved into or out of a space between the pressing mechanism 2 and the carrying mechanism 1. Specifically, the intermediary mechanism 5 can be moved into the space between the pressing mechanism 2 and the carrying mechanism 1 through the transferring mechanism 6 (e.g., a robotic arm), and can be fixed to one of the carrying mechanism 1 and the pressing mechanism 2.

Moreover, when the pressing mechanism 2 and the carrying mechanism 1 are at the seal position (shown in FIG. 2), the first chamber 11 and the second chamber 21 jointly define a work space P, and the intermediary mechanism 5 is arranged in the work space P therein. The suction mechanism 4 is connected to the first chamber 11 of the carrying mechanism 1, and when the pressing mechanism 2 and the carrying mechanism 1 are at the seal position, the suction mechanism 4 is configured to suction away air in the work space P so as to allow the work space P to be in a vacuum state, but the present disclosure is not limited thereto. For example, in other embodiments of the present disclosure, the suction mechanism 4 can be connected to the second chamber 21 of the pressing mechanism 2. Accordingly, the suction mechanism 4 in the present embodiment can be connected to at least one of the pressing mechanism 2 and the carrying mechanism 1.

Figure 5A:
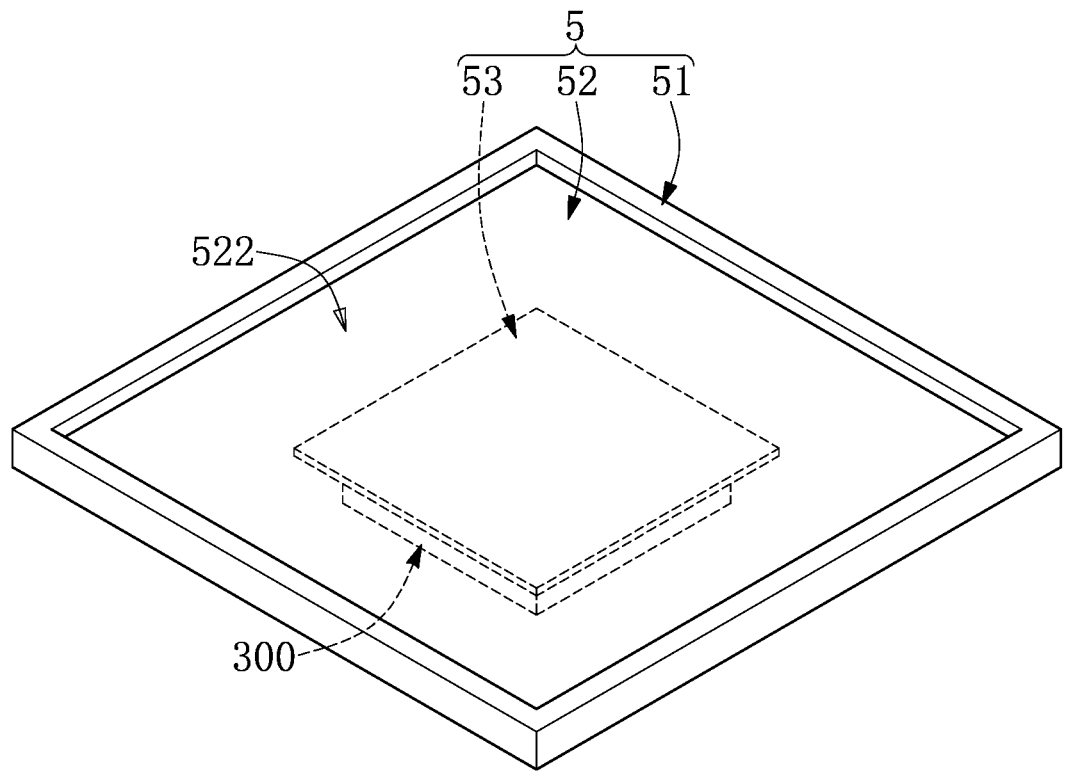
FIG. 5A is a perspective view showing an intermediary mechanism of the attaching apparatus of FIG. 1.

As shown in FIG. 1 and FIG. 5A, the intermediary mechanism 5 includes a frame 51, a deformable sheet 52 fixed to the frame 51, and an adhesive layer 53 disposed on the deformable sheet 52. In the present embodiment, the frame 51 can be an annular structure for being detachably assembled to one of the supports 13, 25 of the carrying mechanism 1 and the pressing mechanism 2. The deformable sheet 52 can be a metallic foil or a resin film, and is preferable a stretchable structure. The peripheral portion of the deformable sheet 52 is fixed to the frame 51, so that the deformable sheet 52 can have a predetermined tension.

The adhesive layer 53 can be a sheet-like component having sticky for adhering at least one attaching object 300 onto a side of the deformable sheet 52 (e.g., the bottom side of the deformable sheet 52 shown in FIG. 1) facing the carrying surface 123 of the carrying mechanism 1. In the present embodiment, an adhesion force between the adhesive layer 53 and the attaching object 300 is less than an adhesion force between the attaching object 300 and the attached object 200, so that when the attaching object 300 is adhered to the attached object 200, the attaching object 300 can be easily separated from the adhesive layer 53. It should be noted that the attaching object 300 and the attached object 200 can be provided with an adhesive film there-between (not shown, e.g., the adhesive film can be fixed on the attaching object 300 or the attached object 200). Specifically, the adhesive film is provided with a release film (not shown) thereon, and the release film is torn from the adhesive film before the attaching object 300 is attached to the attached object 200.

Specifically, the deformable sheet 52 in the present embodiment is resiliently deformable, so that the deformable sheet 52 can be pressed by an external force to have deformation and tends to return to an original shape after the external force is disappeared, but the present disclosure is not limited thereto. For example, in other embodiments of the present disclosure, the deformable sheet 52 can be unable to return to the original shape after having any deformation.

Moreover, the deformable sheet 52 in the present embodiment includes a first surface 521 and a second surface 522 that is opposite to the first surface 521. The first surface 521 faces the carrying surface 123 of the carrying mechanism 1, and the second surface 522 faces the pressing member 23 of the pressing mechanism 2. In other words, the first surface 521 and the second surface 522 of the deformable sheet 52 in the present embodiment are perpendicular to the height direction H (or a direction of the relative movement of the carrying mechanism 1 and the pressing mechanism 2), but the present disclosure is not limited thereto.

Figure 6:
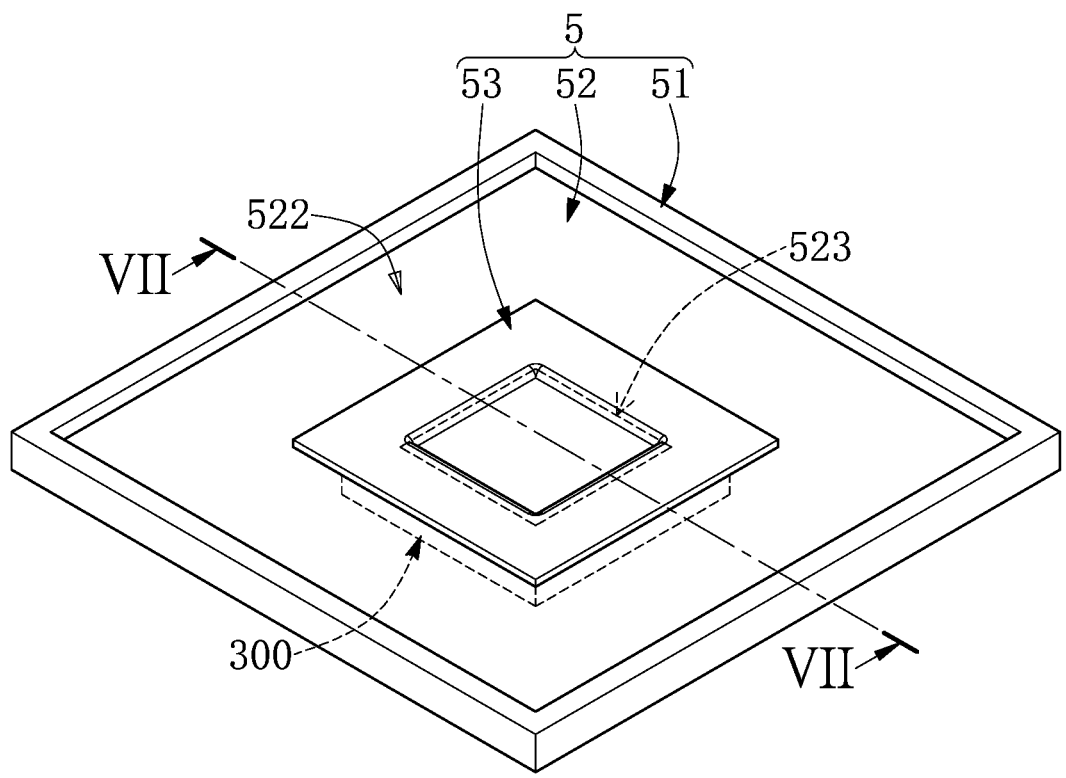
FIG. 6 is a perspective view showing the intermediary mechanism in another configuration according to the first embodiment of the present disclosure.
Figure 7:
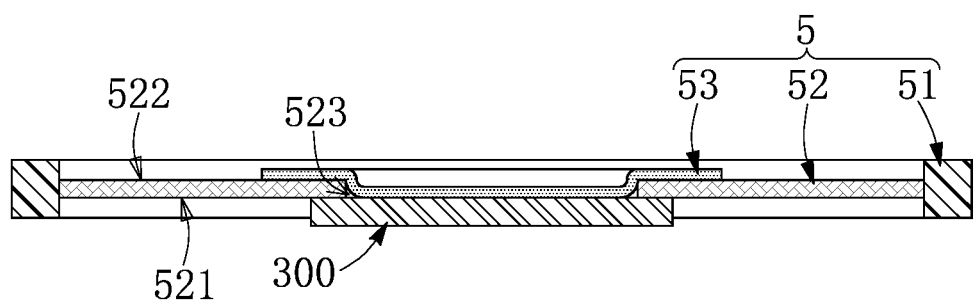
FIG. 7 is a cross-sectional view taken along line VII-VII of FIG. 6.

In the present embodiment, the structure of the deformable sheet 52 can be adjusted or changed according to design requirements. For example, as shown in FIG. 1 and FIG. 5A, the deformable sheet 52 can be formed without any hole, and the adhesive layer 53 is disposed (or fixed) on the first surface 521 of the deformable sheet 52. Or, as shown in FIG. 6 and FIG. 7, the deformable sheet 52 can have at least one thru-hole 523 penetratingly formed from the first surface 521 to the second surface 522, the adhesive layer 53 is disposed (or fixed) on the second surface 522 of the deformable sheet 52, and a portion of the adhesive layer 53 is arranged in the at least one thru-hole 523 for adhering (or fixing) the at least one attaching object 300. Moreover, in other embodiments of the present disclosure, the deformable sheet 52 can have at least one thru-hole 523, the adhesive layer 53 is disposed on the first surface 521 of the deformable sheet 52 and covers the at least one thru-hole523, and a surface of the adhesive layer 53 away from the at least one thru-hole 523 is provided for adhering (or fixing) the at least one attaching object 300. The number of the thru-hole 523 of the deformable sheet 52 is preferable equal to that of the attaching object 300, but the present disclosure is not limited thereto. For example, the number of the thru-hole 523 of the deformable sheet 52 can be greater than that of the attaching object 300.

Figure 5B:
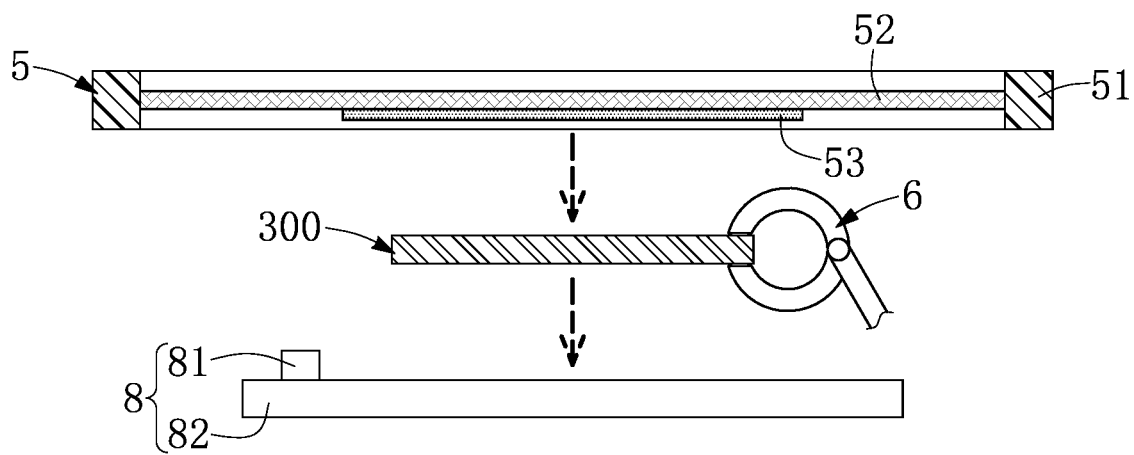
FIG. 5B is a schematic view showing a pre-adhesive alignment mechanism of the attaching apparatus according to the first embodiment of the present disclosure.

It should be noted that the connection between the deformable sheet 52 and the attaching object 300 can be achieved by the pre-adhesive alignment mechanism 8, and the pre-adhesive alignment mechanism 8 of the present embodiment shown in FIG. 5B is arranged outside of the carrying mechanism 1 and the pressing mechanism 2, but the present disclosure is not limited thereto. For example, in other embodiments of the present disclosure, the pre-adhesive alignment mechanism 8 can be disposed on at least one of the carrying mechanism 1 and the pressing mechanism 2.

Specifically, as shown in FIG. 5B, the pre-adhesive alignment mechanism 8 includes a position correction platform 81 and an optical alignment unit 82. The transferring mechanism 6 can move the attaching object 300 onto the position correction platform 81, and the optical alignment unit 82 can be used to derive a relative position between the attaching object 300 on the position correction platform 81 and the attached object 200. Accordingly, a position of the attaching object 300 can be corrected (or adjusted) according to the relative position by using pre-adhesive alignment mechanism 8, and then the attaching object 300 can be fixed onto the intermediary mechanism 5 through the adhesive layer 53.

Figure 8:
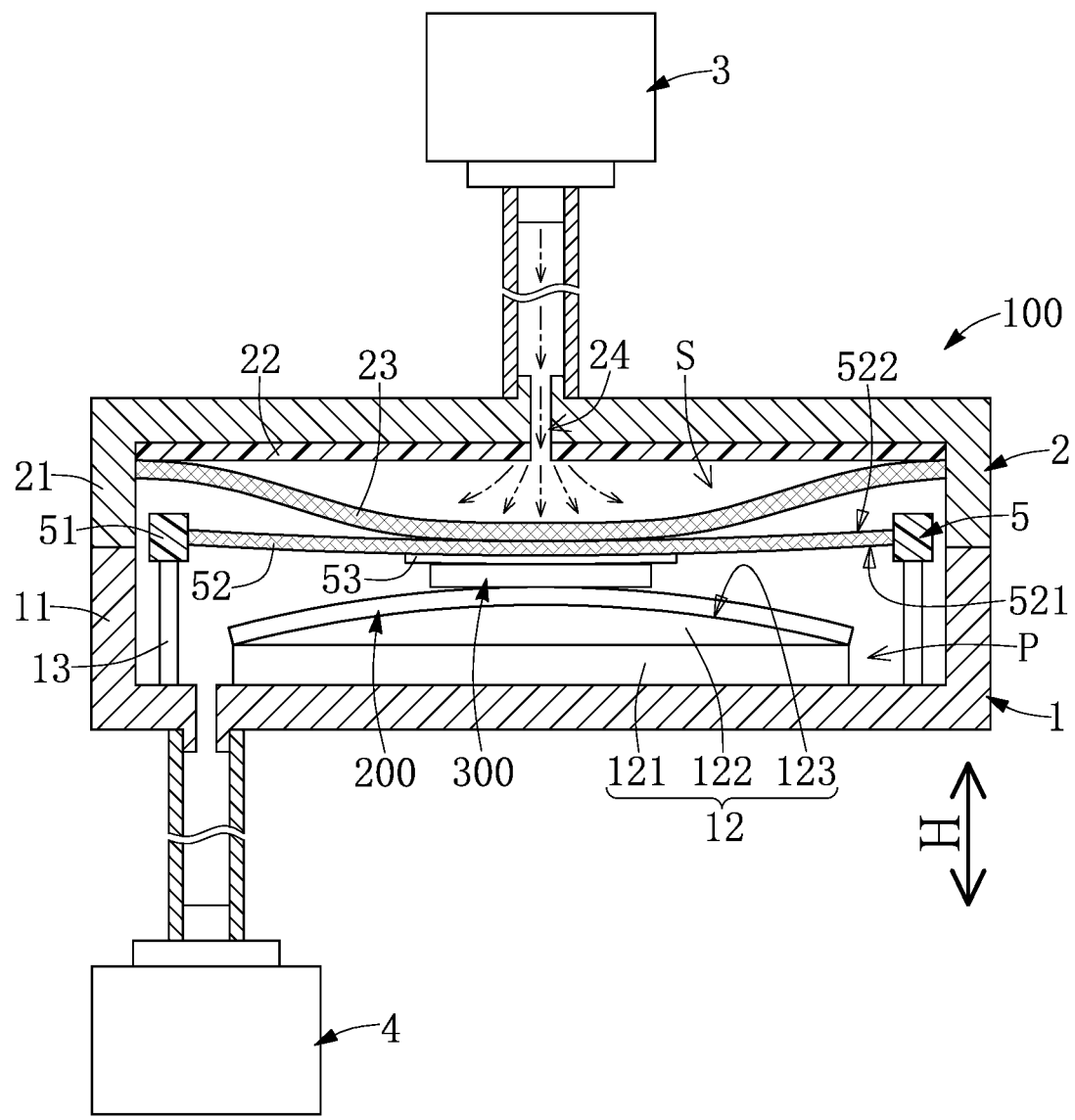
FIG. 8 is a first schematic view showing an attaching step of an attaching method that is implemented by using the attaching apparatus according to the first embodiment of the present disclosure.
Figure 9:
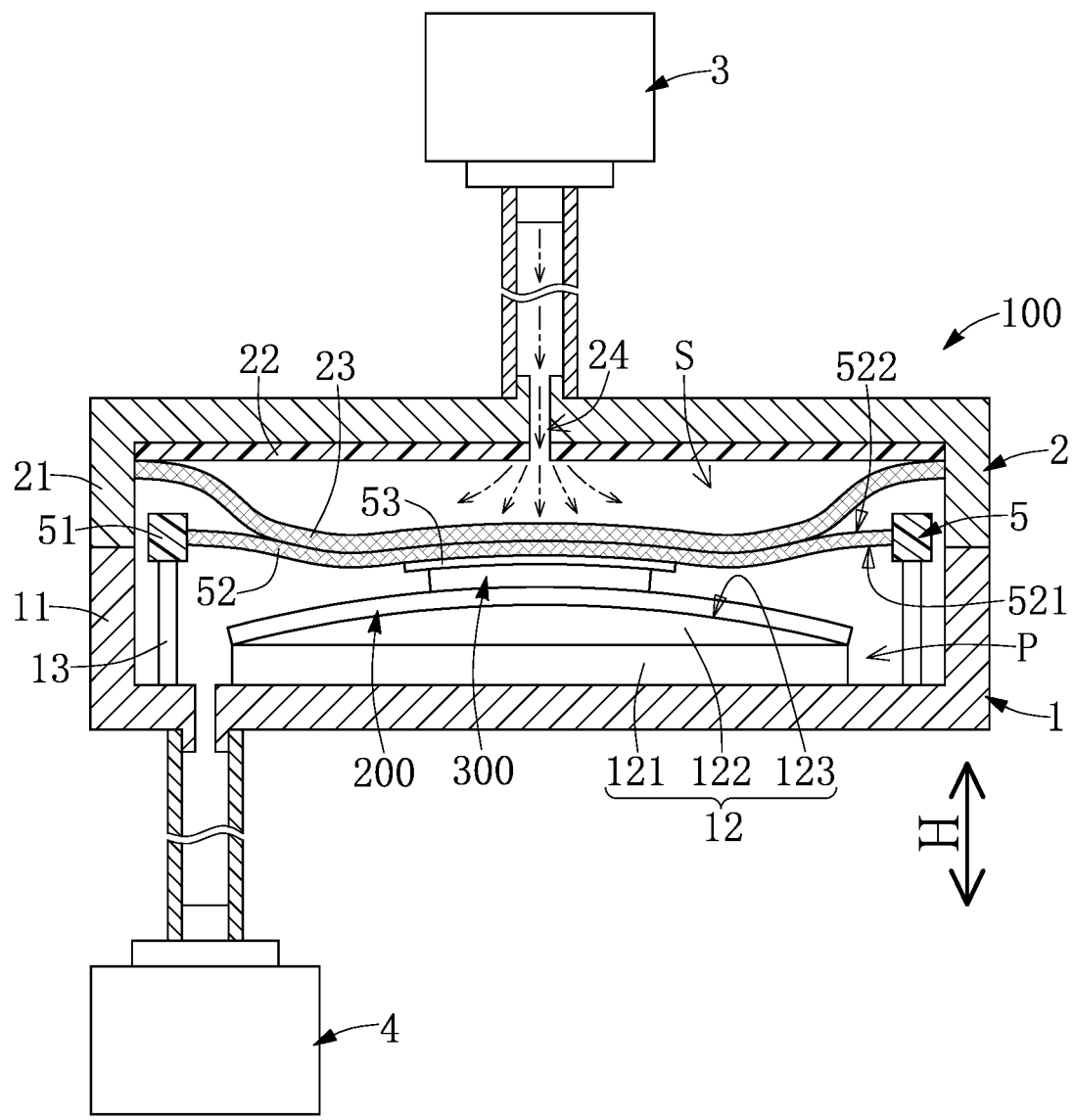
FIG. 9 is a second schematic view showing the attaching step of the attaching method that is implemented by using the attaching apparatus according to the first embodiment of the present disclosure.

The structure of each component of the attaching apparatus 100 is described in the above description, and the following description describes the connection relationship of each component of the attaching apparatus 100. As shown in FIG. 2, FIG. 8, and FIG. 9, when the pressing mechanism 2 and the carrying mechanism 1 are at the seal position, the attached object 200 is fixed on the carrying surface 123, and the at least one attaching object 300 is adhered onto the deformable sheet 52, the filled space S of the pressing mechanism 2 is configured to be filled with a fluid (e.g., gas or liquid) through the filling opening 24 by the filling mechanism 3, and the filled space S is gradually expanded toward the deformable sheet 52 to force the pressing member 23 to gradually press the deformable sheet 52, so that the deformable sheet 52 is gradually deformed toward the carrying surface 123 to press the at least one attaching object 300 onto the attached object 200.

Specifically, when the pressing mechanism 2 and the carrying mechanism 1 are at the seal position, the suction mechanism 4 can be used to suction away the air in the work space P so as to allow the work space P to be in the vacuum state, the pressing member 23 is configured to be pressed by the filled space S so as to be deformable in an expansion range R, and a portion of the deformable sheet 52 corresponding in position to the adhesive layer 53 is arranged in the expansion range R. Accordingly, the deformable sheet 52 can be pressed by the pressing member 23 of the pressing mechanism 2 so as to gradually deform toward the carrying surface 123 of the carrying mechanism 1, thereby pressing the at least one attaching object 300 onto the attached object 200 that is disposed on the carrying mechanism 1.

If the deformable sheet 52 is formed as a structure shown in FIG. 6 and FIG. 7 and is gradually pressed by the pressing member 23, a portion of the pressing member 23 can press the at least one attaching object 300 by passing through the at least one thru-hole 523. Moreover, since the deformable sheet 52 in the present embodiment is resiliently deformable, after the pressing member 23 stops pressing the deformable sheet 52, the deformable sheet 52 tends to return to the original shape.

The above description describes the attaching apparatus 100 of the present embodiment, and the following description describes the attaching method of the present embodiment that is implemented by using the attaching apparatus 100 disclosed in the above description.

As shown in FIG. 1, FIG. 2, and FIG. 8 to FIG. 10, the attaching method in the present embodiment includes a preparing step, a placing step, a sealing step, an attaching step, and a retrieving step. The sequence or detail of the above steps can be adjusted or changed according to design requirements, and are not limited to the present embodiment.

It should be noted that in each of the steps of the attaching method, the pre-adhesive alignment mechanism 8 of the attaching apparatus 100 can be used to implement position read or compensation of any two objects by an optical manner, thereby ensuring the accuracy of the implementation of the attaching method (i.e., the attaching object 300 can be accurately adhered onto a predetermined position of the attached object 200).

As shown in FIG. 1, the preparing step is implemented by disposing at least one attaching object 300 onto the deformable sheet 52 through the adhesive layer 53, and disposing an attached object 200 onto the carrying surface 123 of the carrying mechanism 1. If the deformable sheet 52 is formed as the structure shown in FIG. 6 and FIG. 7, a portion of the adhesive layer 53 needs to be pressed into the at least one thru-hole 523 for adhering the at least one attaching object 300. Specifically, as shown in FIG. 5B, the attaching object 300 is moved to the position correction platform 81 by the transferring mechanism 6, a position of the attaching object 300 is corrected by using the optical alignment unit 82 to derive a relative position between the attaching object 300 on the position correction platform 81 and the attached object 200, and then the attaching object 300 is fixed onto the intermediary mechanism 5 through the adhesive layer 53.

As shown in FIG. 1 and FIG. 2, the placing step is implemented by disposing the intermediary mechanism 5 between the pressing mechanism 2 and the carrying mechanism 1 that are both at the open position, in which the frame 51 of the intermediary mechanism 5 is fastened to one of the carrying mechanism 1 and the pressing mechanism 2, and the at least one attaching object 300 faces the carrying surface 123 of the carrying mechanism 1.

In the present embodiment, the transferring mechanism 6 is configured to hold the intermediary mechanism 5 and to move the intermediary mechanism 5 into a space between the carrying surface 123 and the pressing member 23 by fastening the frame 51 to one of the carrying mechanism 1 and the pressing mechanism 2.

As shown in FIG. 2, the sealing step is implemented by relatively moving (or moving at least one of) the pressing mechanism 2 and the carrying mechanism 1 so as to be at the seal position, in which the intermediary mechanism 5 and the at least one attaching object 300 are respectively arranged adjacent to the pressing member 23 and the attached object 200. Moreover, in the sealing step, the suction mechanism 4 can be used to suction away air in the work space P so as to allow the work space P to be in a vacuum state.

As shown in FIG. 8 and FIG. 9, the attaching step is implemented by using the filling mechanism 3 to fill a fluid (e.g., gas or fluid) into the filled space S of the pressing mechanism 2 through the filling opening 24, so that the filled space S is gradually expanded toward the deformable sheet 52 to force the pressing member 23 to gradually press the deformable sheet 52, and then the deformable sheet 52 is gradually deformed toward the carrying surface 123 to press the at least one attaching object 300 onto the attached object 200. In addition, if the deformable sheet 52 is formed as the structure shown in FIG. 6 and FIG. 7 and is gradually pressed by the pressing member 23, a portion of the pressing member 23 presses the at least one attaching object 300 by passing through the at least one thru-hole 523.

Specifically, if an outer surface of the attached object 200 is in a curved shape, the attaching object 300 would be pressed by (or clamped between) the pressing member 23 and the attached object 200 to be deformed as a curved structure, thereby entirely attaching onto the outer surface of the attached object 200 (e.g., no bubble exists between the attaching object 300 and the attached object 200). Moreover, the deformable sheet 52 is gradually pressed by the pressing member 23 to be slowly deformed, so that the attaching object 300 is also slowly deformed by the deformable sheet 52 for entirely attaching the attached object 200.

Figure 10:
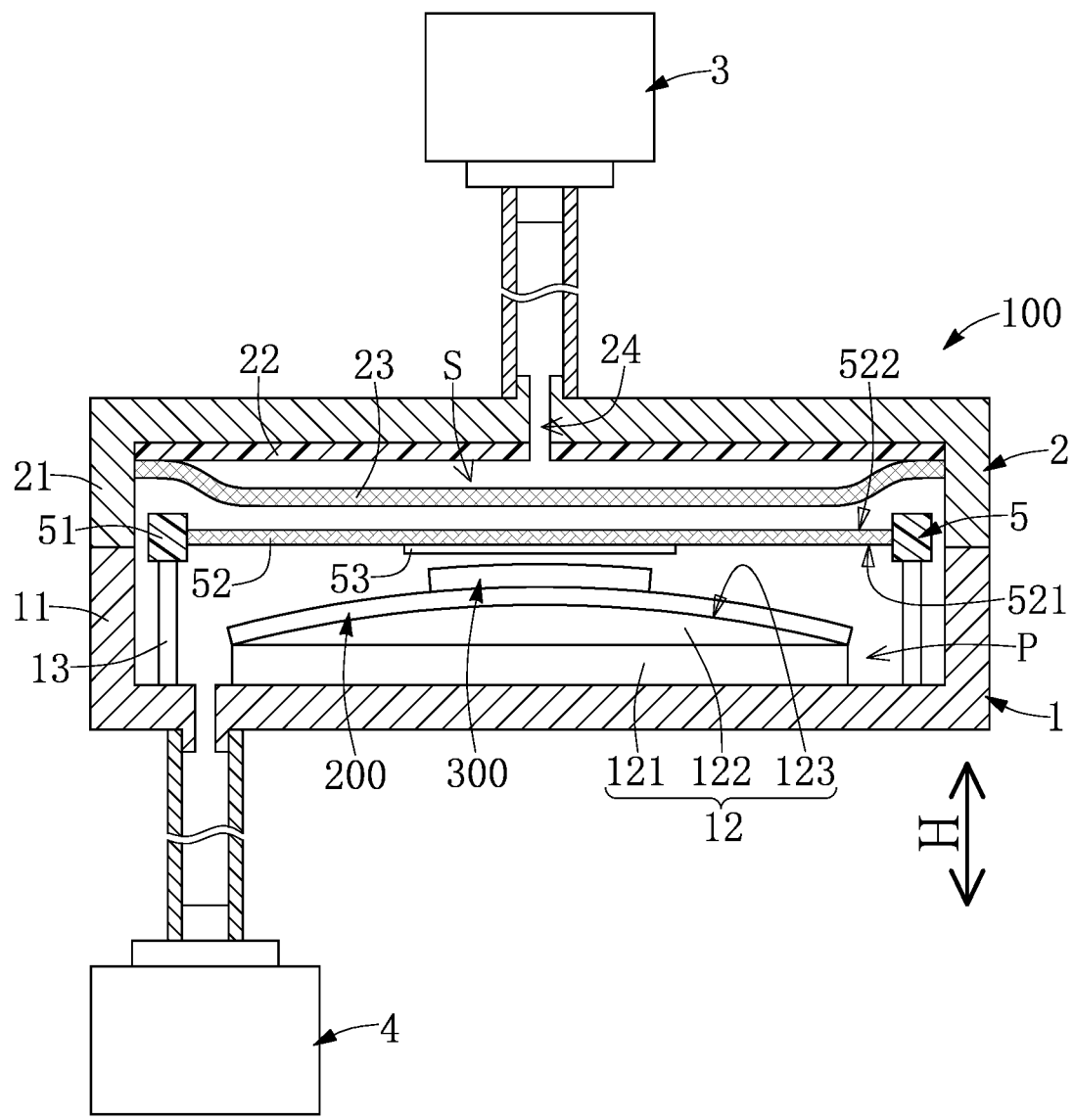
FIG. 10 is a schematic view showing a retrieving step of the attaching method that is implemented by using the attaching apparatus according to the first embodiment of the present disclosure.

As shown in FIG. 10, the retrieving step is implemented by using the filling mechanism 3 to expel the fluid from the filled space S through the filling opening 24 to stop the pressing member 23 from pressing the deformable sheet 52, so that the at least one attaching object 300 separates from the adhesive layer 53 and is only adhered to the attached object 200. In the present embodiment, an adhesion force between the adhesive layer 53 and the at least one attaching object 300 is less than an adhesion force between the at least one attaching object 300 and the attached object 200, so that the at least one attaching object 300 can be easily separated from the adhesive layer 53, but the present disclosure is not limited thereto.

In addition, after the retrieving step is implemented, another attaching object (not shown) can be attached onto the same attached object 200 by implementing the attaching method again, so that the number of the attaching object 300 attached onto the attached object 200 can be more than one.

Second Embodiment

Referring to FIG. 11 to FIG. 20, a second embodiment of the present disclosure is similar to the first embodiment of the present disclosure, so that descriptions of the same components in the first and second embodiments of the present disclosure will be omitted for the sake of brevity, and the following description only discloses different features between the first and second embodiments. Any one of the attaching apparatus 100 and the attaching method of the present embodiment is used to simultaneously attach a plurality of attaching objects 300 (e.g., two attaching objects 300) onto an attached object 200.

Figure 11:
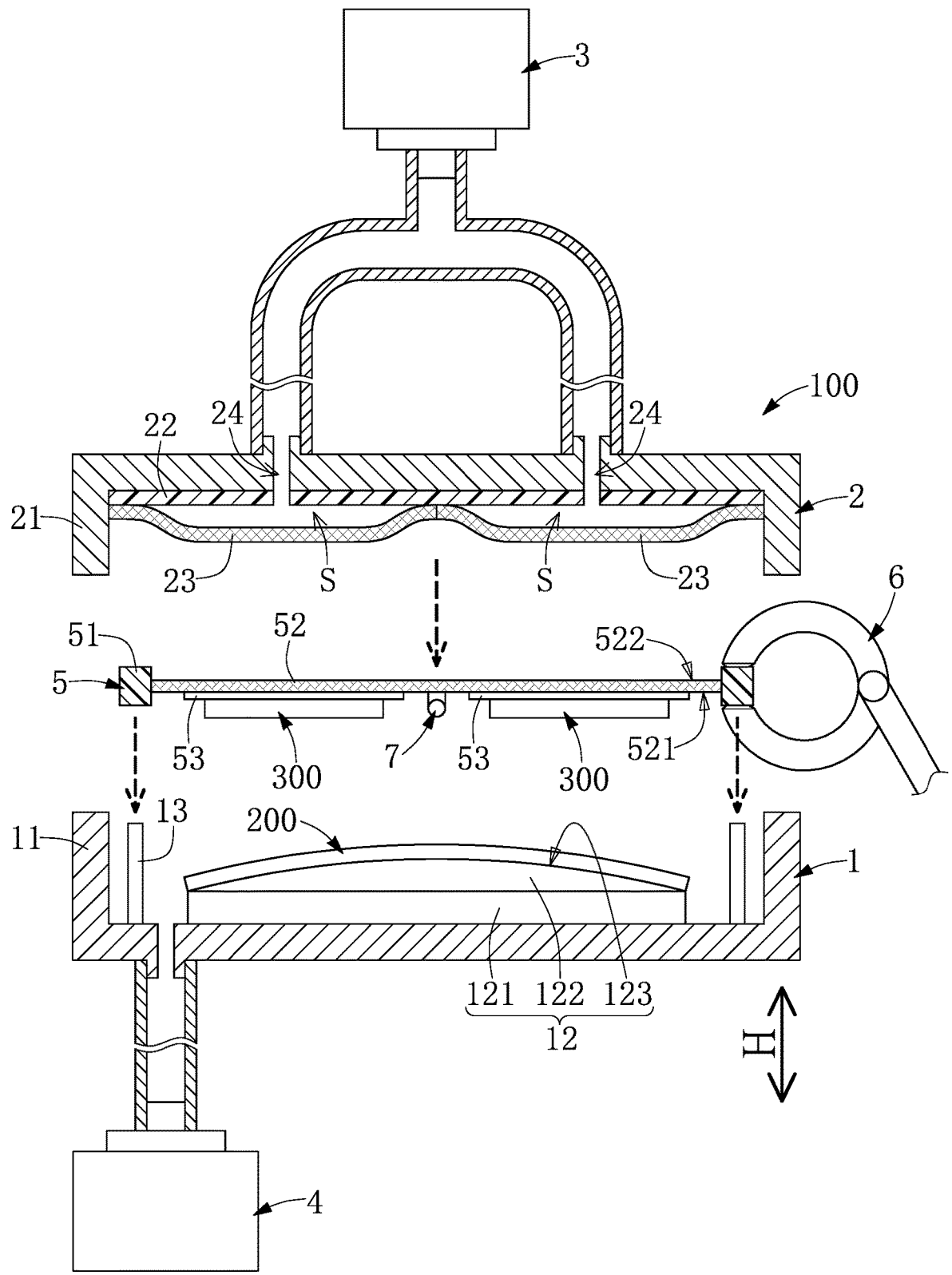
FIG. 11 is a schematic view showing an attaching apparatus at an open position according to a second embodiment of the present disclosure.
Figure 12:
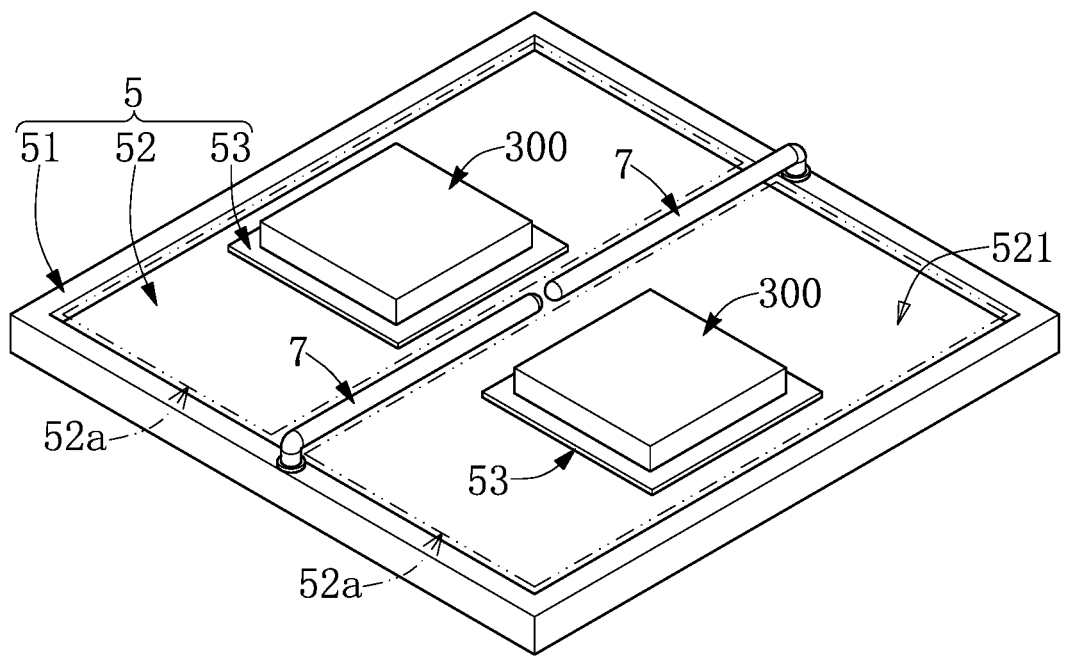
FIG. 12 is a perspective view showing an intermediary mechanism of the attaching apparatus of FIG. 11.

Specifically, as shown in FIG. 11 and FIG. 12, the pressing mechanism 2 can include two pressing members 23. In other words, the number of the pressing members 23 of the pressing mechanism 2 can be adjusted according to the number of the attaching objects 300, but the present disclosure is not limited thereto. For example, in other embodiments of the present disclosure, the number of the pressing members 23 of the pressing mechanism 2 can be only one.

Moreover, the attaching apparatus 100 in the present embodiment includes two recurving members 7 movably fastened to the frame 51 of the intermediary mechanism 5. The two recurving members 7 are paired and are movable to be arranged at a side of the frame 51 that is adjacent to the first surface 521 shown in FIG. 12, so that the deformable sheet 52 can be divided into (or defined as) two regions 52a by the two recurving members 7, and the two regions 52a of the deformable sheet 52 are respectively configured to fix two attaching objects 300 through the adhesive layer 53.

It should be noted that each of the regions 52a and the corresponding attaching object 300 can be fixed with each other through the adhesive layer 53 such as shown in FIG. 6 and FIG. 7. Moreover, the two recurving members 7 shown in FIG. 12 are two rods having the same length, but the present disclosure is not limited thereto. For example, in other embodiments of the present disclosure, the two recurving members 7 can have different length.

Accordingly, when the deformable sheet 52 is gradually deformed toward the carrying surface 123 of the carrying mechanism 1 (i.e., in the attaching step), the two regions 52a are respectively pressed by the two pressing members 23, and a portion of the deformable sheet 52 between the two regions 52a is abutted against the two recurving members 7, so that the two regions 52a are independently deformable to press the two attaching objects 300 onto the attached object 200, respectively.

Figure 13A:
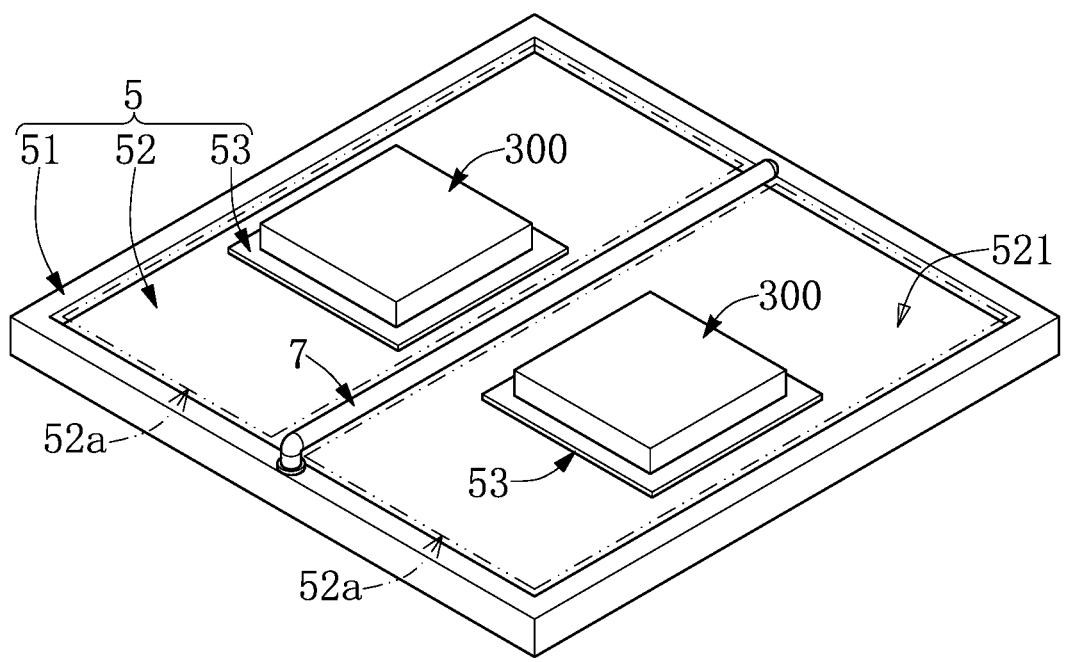
FIG. 13A is a perspective view showing the intermediary mechanism of FIG. 11 in another configuration.

In addition, the structure of the recurving member 7 of the attaching apparatus 100 can be adjusted or changed according to design requirements, and is not limited to the structure shown in FIG. 12. For example, as shown in FIG. 13A, the attaching apparatus 100 can include one recurving member 7 that is movably arranged at one side of the frame 51 and facing the carrying surface 123. The deformable sheet 52 can be divided into (or defined as) two regions 52a by the recurving member 7, and the two regions 52a of the deformable sheet 52 are respectively configured to fix two attaching objects 300 through the adhesive layer 53. Specifically, when the deformable sheet 52 is gradually deformed toward the carrying surface 123 of the carrying mechanism 1, a portion of the deformable sheet 52 between the two regions 52a is abutted against the recurving member 7, so that the two regions 52a are independently deformable to press the two attaching objects 300 onto the attached object 200, respectively.

Figure 13B:
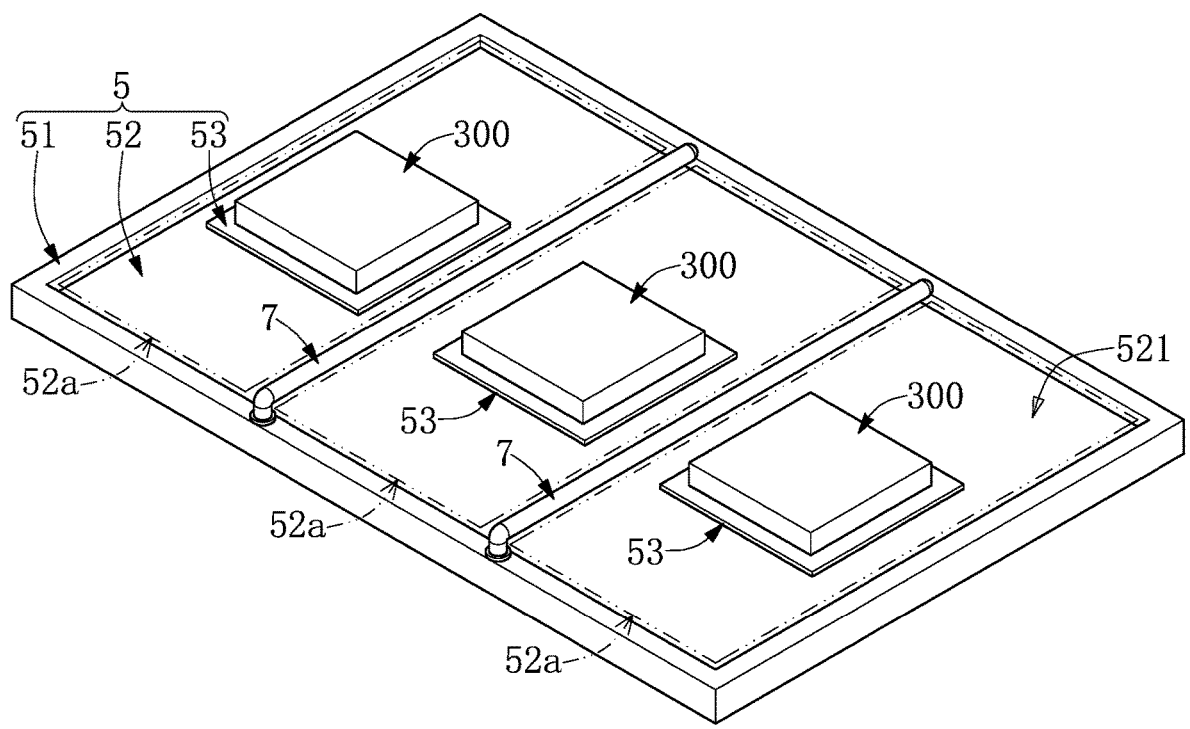
FIG. 13B is a perspective view showing the intermediary mechanism derived from that of FIG. 13A.

Moreover, if the number of the attaching objects 300 is more than two, the structure of the recurving member 7 of the attaching apparatus 100 can be correspondingly changed. For example, as shown in FIG. 13B, when the number of the attaching objects 300 is three, the attaching apparatus 100 includes two recurving members 7 spaced apart from each other, and the cooperation and function of the two recurving members 7 and the intermediary mechanism 5 are similar to the structure shown in FIG. 13A. Specifically, according to the structures shown in FIG. 13A and FIG. 13B, the number of the recurving member 7 in the present embodiment can be less than that of the attaching object 300 by one. In other words, if the number of the attaching objects 300 is N, the number of the recurving member 7 is N−1, and N is a positive integer more than one.

Figure 13C:
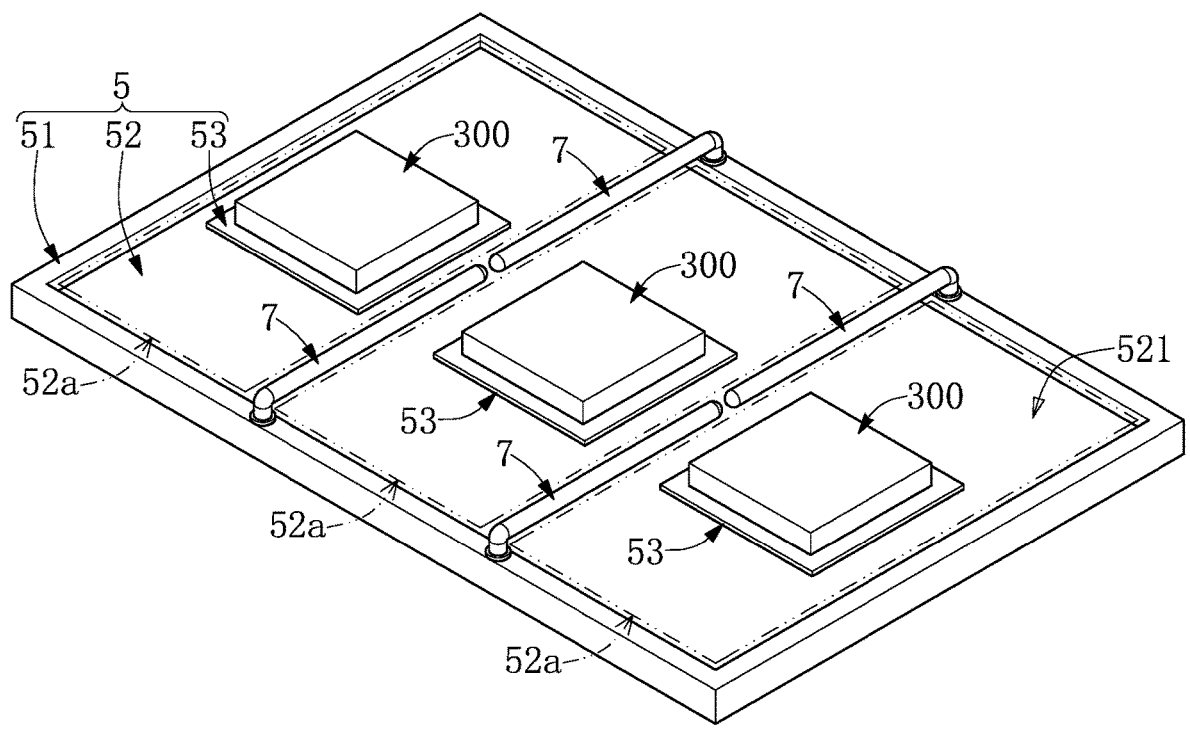
FIG. 13C is a perspective view showing the intermediary mechanism derived from that of FIG. 12.

As shown in FIG. 13C, when the number of the attaching objects 300 is three, the attaching apparatus 100 can include four recurving members 7 spaced apart from each other, and the cooperation and function of the four recurving members 7 and the intermediary mechanism 5 are similar to the structure shown in FIG. 12. Specifically, according to the structures shown in FIG. 12 and FIG. 13C, the number of the recurving member 7 in the present embodiment can be double of the number of the attaching object 300 with further minus two. In other words, if the number of the attaching objects 300 is N, the number of the recurving member 7 is 2(N−1), and N is a positive integer more than one. The 2(N−1) number of recurving members 7 are arranged at a side of the frame 51 and are defined as a plurality of pairs, the deformable sheet 52 can be divided into (or defined as) N number of regions 52a by the 2(N−1) number of the recurving members 7, and the N number of the regions 52a of the deformable sheet 52 are respectively configured to fix N number of attaching objects 300 through the adhesive layer 53.

It should be noted that any two of the recurving members 7 defined as one pair are respectively fastened to two portions of the frame 51 facing each other, so that the pair of the two recurving members 7 can be moved along a straight direction for easily dividing the deformable sheet 52 into a plurality of region 52a, but the present disclosure is not limited thereto.

Figure 14:
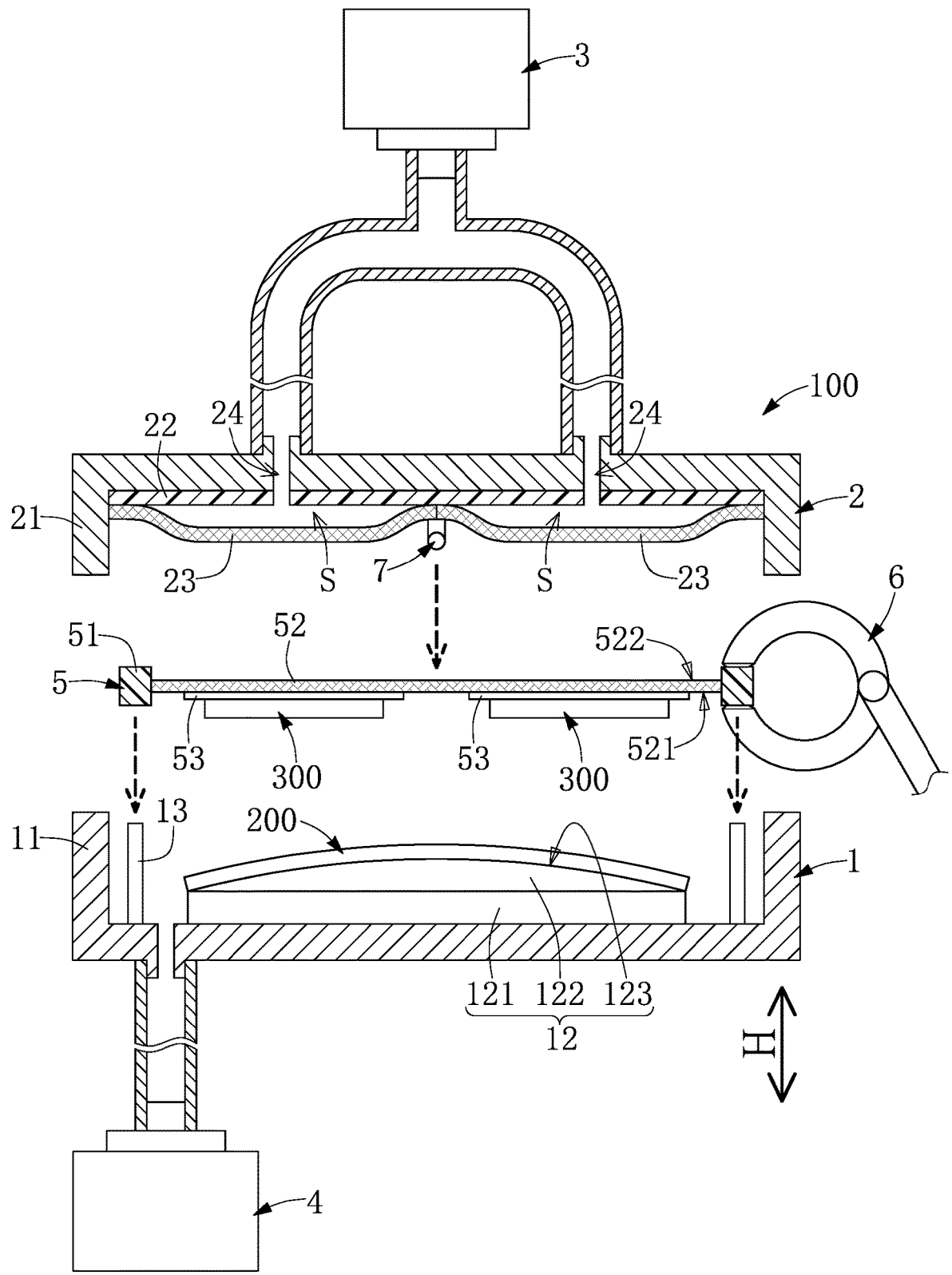
FIG. 14 is a schematic view showing a recurving member of the attaching apparatus disposed on a pressing mechanism according to the second embodiment of the present disclosure.
Figure 15:
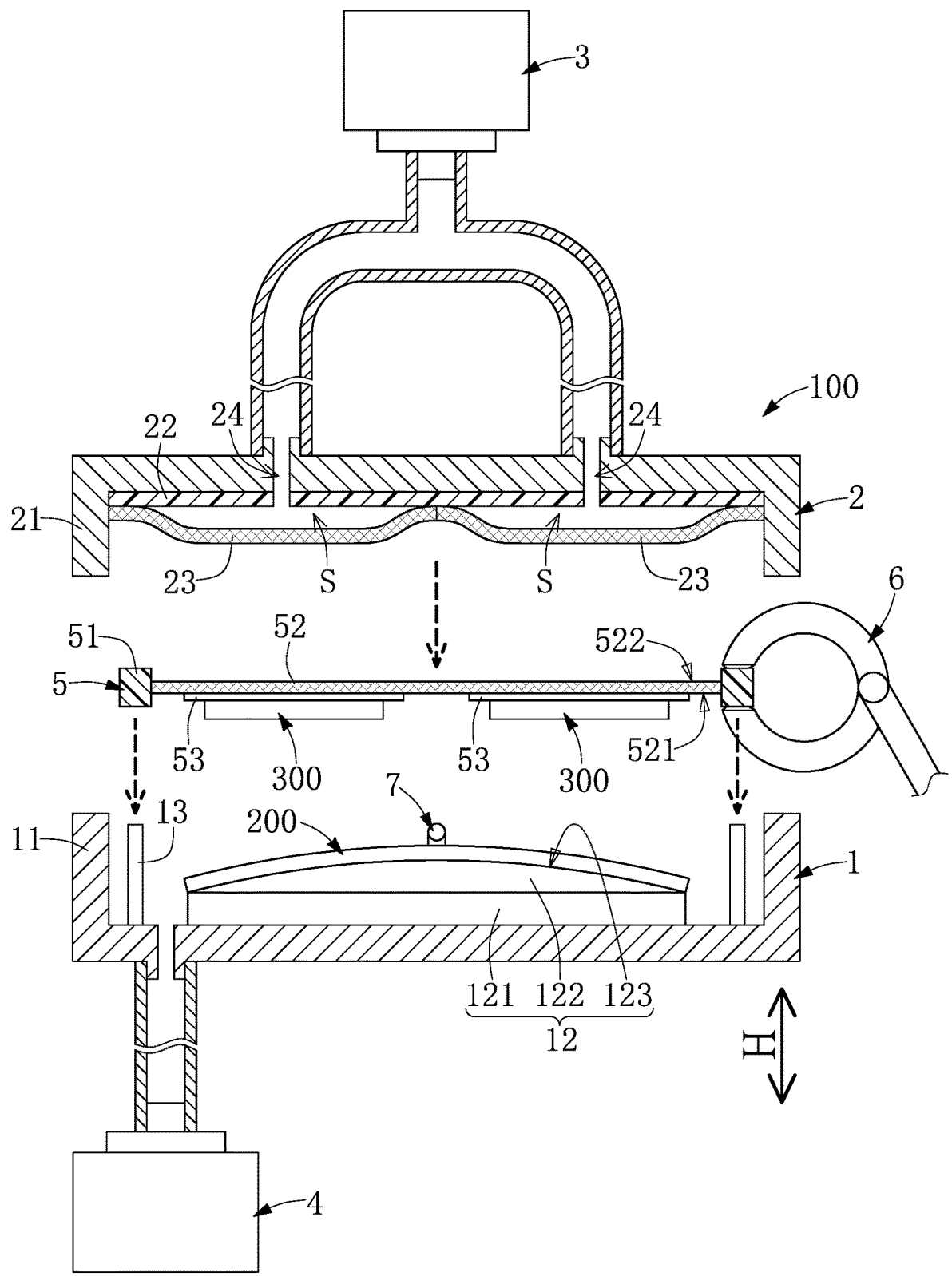
FIG. 15 is a schematic view showing the recurving member of the attaching apparatus disposed on a carrying mechanism according to the second embodiment of the present disclosure.

In addition, as shown in FIG. 14 and FIG. 15, the recurving member 7 can be fastened to the pressing mechanism 2 or the carrying mechanism 1. In other words, the recurving member 7 of the present embodiment can be fastened to one of the pressing mechanism 2, the carrying mechanism 1, and the intermediary mechanism 5.

The above description describes the attaching apparatus 100 of the present embodiment, and the following description describes the attaching method of the present embodiment that uses the attaching apparatus 100 disclosed in the above description.

As shown in FIG. 11, FIG. 12, and FIG. 16 to FIG. 19, the attaching method in the present embodiment includes a preparing step, a placing step, a sealing step, an attaching step, and a retrieving step. The steps of the present embodiment is similar to the corresponding steps of the first embodiment, so that descriptions of the same features in the first and second embodiments of the present disclosure will be omitted for the sake of brevity, and the sequence or detail of the above steps can be adjusted or changed according to design requirements, and are not limited to the present embodiment.

It should be noted that in each of the steps of the attaching method, the pre-adhesive alignment mechanism 8 of the attaching apparatus 100 can be used to implement position read or compensation of any two objects by an optical manner, thereby ensuring the accuracy of the implementation of the attaching method (i.e., the attaching objects 300 can be accurately adhered onto predetermined positions of the attached object 200).

As shown in FIG. 11 and FIG. 12, the preparing step is implemented by disposing a plurality of attaching objects 300 (e.g., two attaching objects 300) onto the deformable sheet 52 through the adhesive layer 53 (e.g., the two attaching objects 300 are respectively disposed on the two regions 52a of the deformable sheet 52 through the adhesive layer 53), and disposing an attached object 200 onto the carrying surface 123 of the carrying mechanism 1. If any one of the regions 52a of the deformable sheet 52 is formed as the structure shown in FIG. 6 and FIG. 7, a portion of the adhesive layer 53 needs to be pressed into the corresponding thru-hole 523 for adhering the corresponding attaching object 300.

Figure 20:
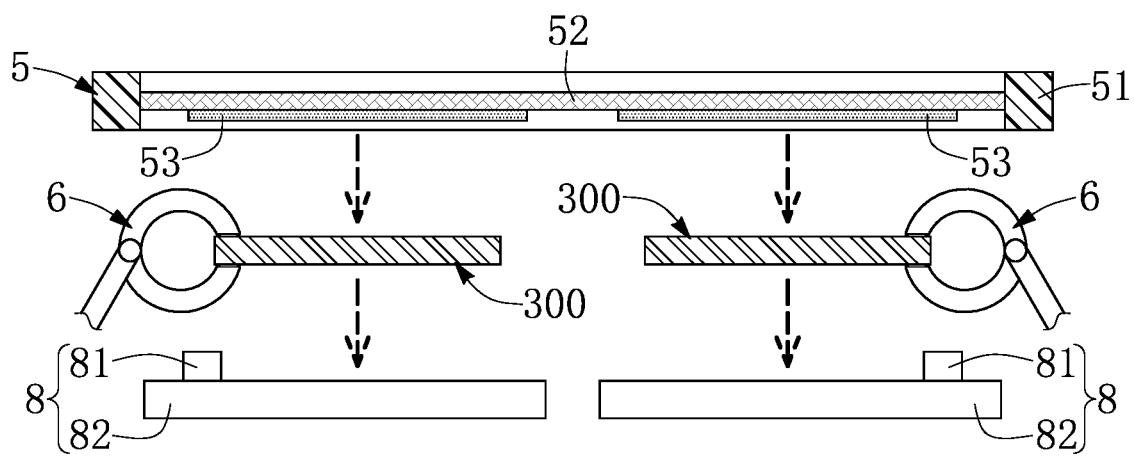
FIG. 20 is a schematic view showing a pre-adhesive alignment mechanism of the attaching apparatus according to the second embodiment of the present disclosure.

Specifically, as shown in FIG. 20, the pre-adhesive alignment mechanism 8 can include a plurality of position correction platforms 81. The attaching objects 300 are respectively moved to the position correction platforms 81 by the transferring mechanism 6, a position of each of the attaching objects 300 is corrected by using the optical alignment unit 82 to derive a relative position between the attaching object 300 on the corresponding position correction platform 81 and the attached object 200, and then each of the attaching objects 300 is fixed onto the intermediary mechanism 5 through the corresponding adhesive layer 53.

Accordingly, the attaching objects 300 can be fixed to the intermediary mechanism5 for maintaining the relative position, so that the attaching objects 300 can be attached onto the attached object 200 by using the one-to-one relationship between the intermediary mechanism 5 and the attached object 200, effectively increasing the efficiency and accuracy of the implementation of the following attaching step.

As shown in FIG. 11, the placing step is implemented by disposing the intermediary mechanism 5 between the pressing mechanism 2 and the carrying mechanism 1 that are both at the open position, in which the frame 51 of the intermediary mechanism 5 is fastened to one of the carrying mechanism 1 and the pressing mechanism 2, and the attaching objects 300 face the carrying surface 123 of the carrying mechanism 1.

In the present embodiment, the transferring mechanism 6 is configured to hold the intermediary mechanism 5 and to move the intermediary mechanism 5 into the space between the carrying surface 123 and the two pressing members 23 by fastening the frame 51 to one of the carrying mechanism 1 and the pressing mechanism 2.

Figure 16:
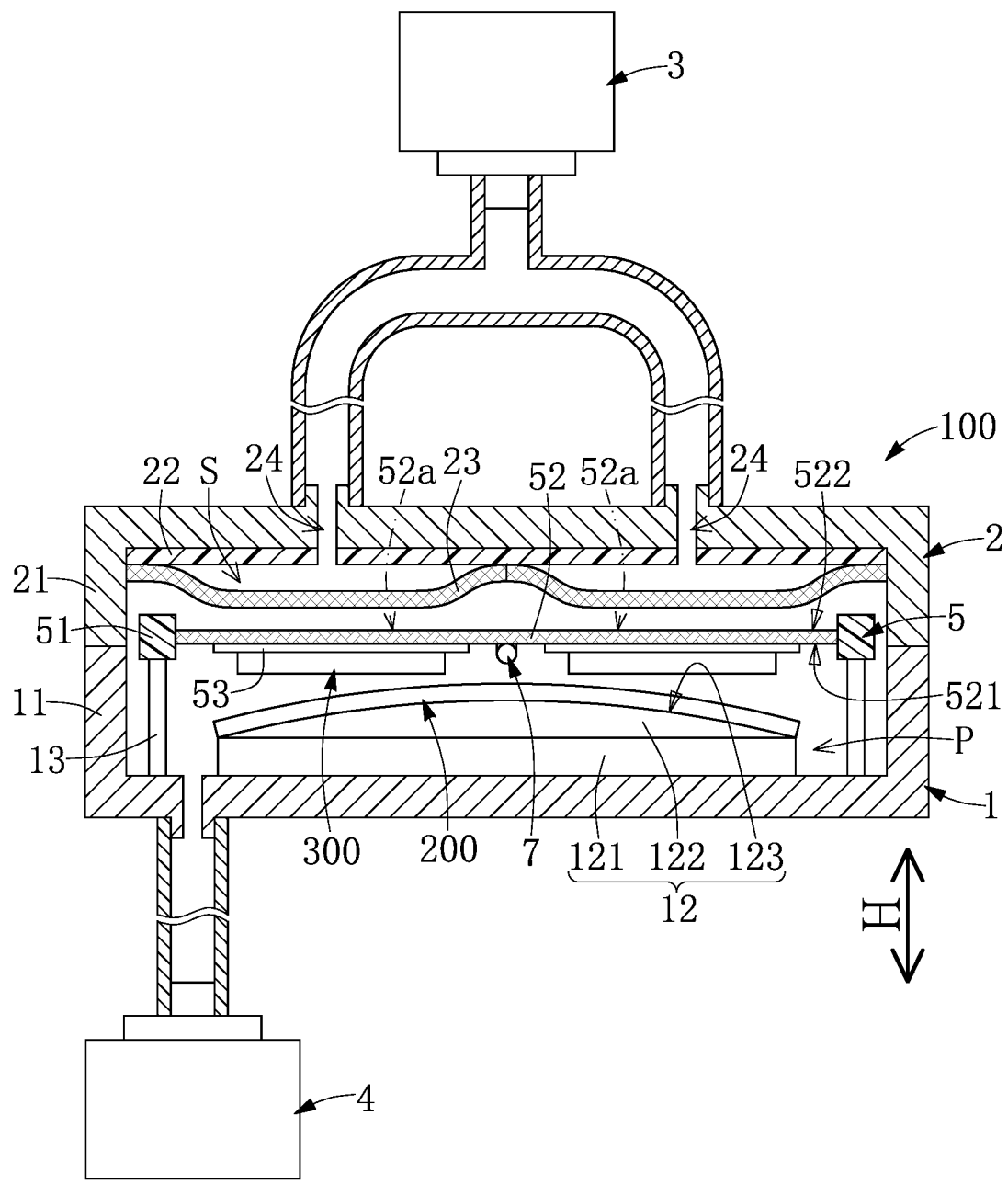
FIG. 16 is a schematic view showing a sealing step of an attaching method that is implemented by using the attaching apparatus according to the second embodiment of the present disclosure.

As shown in FIG. 11 and FIG. 16, the sealing step is implemented by relatively moving (or moving at least one of) the pressing mechanism 2 and the carrying mechanism 1 to the seal position, in which the intermediary mechanism 5 and the attaching objects 300 are respectively arranged adjacent to the pressing members 23 and the attached object 200. Moreover, in the sealing step, the suction mechanism 4 can be used to suction away air in the work space P so as to allow the work space P to be in a vacuum state.

Figure 17:
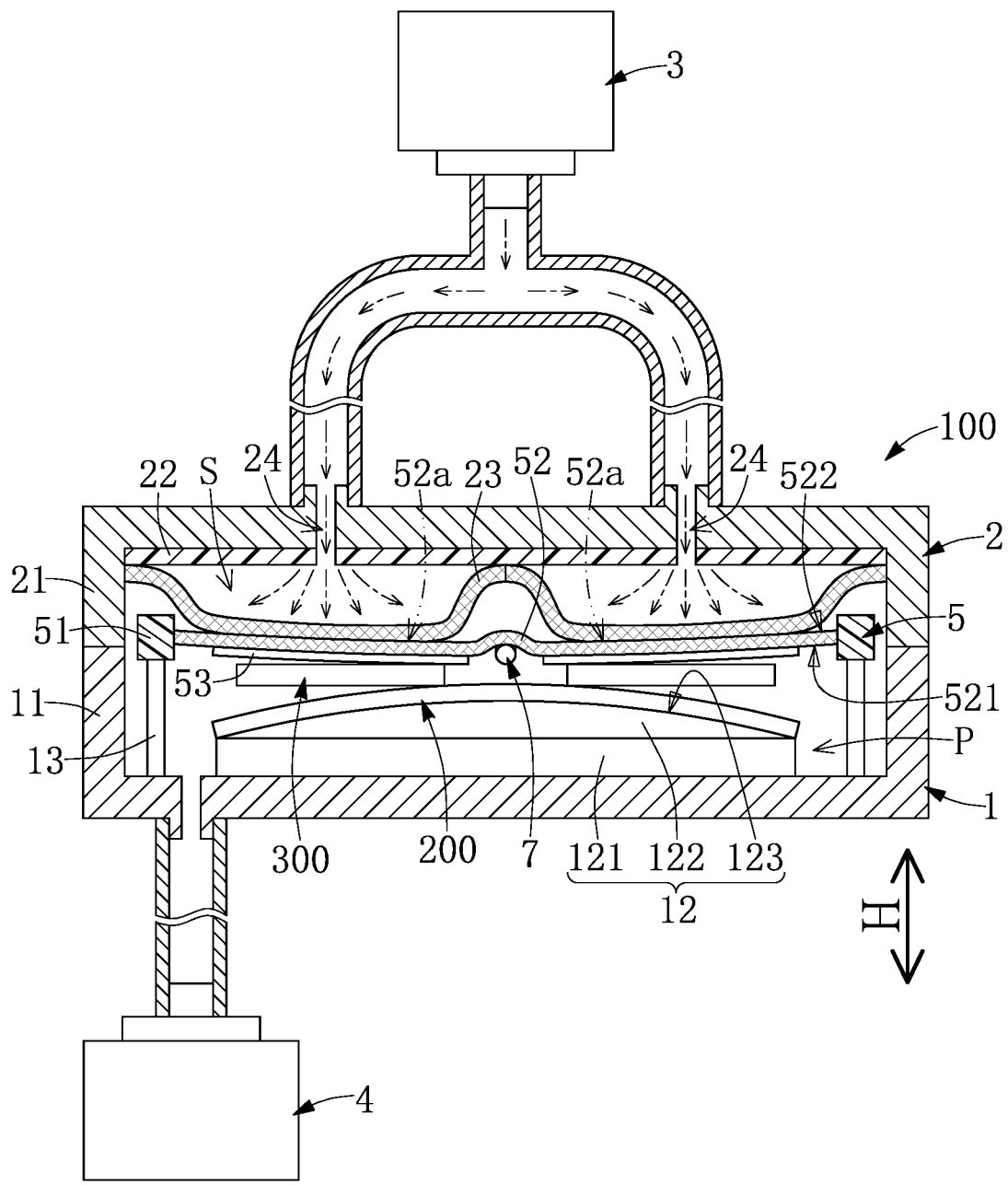
FIG. 17 is a first schematic view showing an attaching step of the attaching method that is implemented by using the attaching apparatus according to the second embodiment of the present disclosure.
Figure 18:
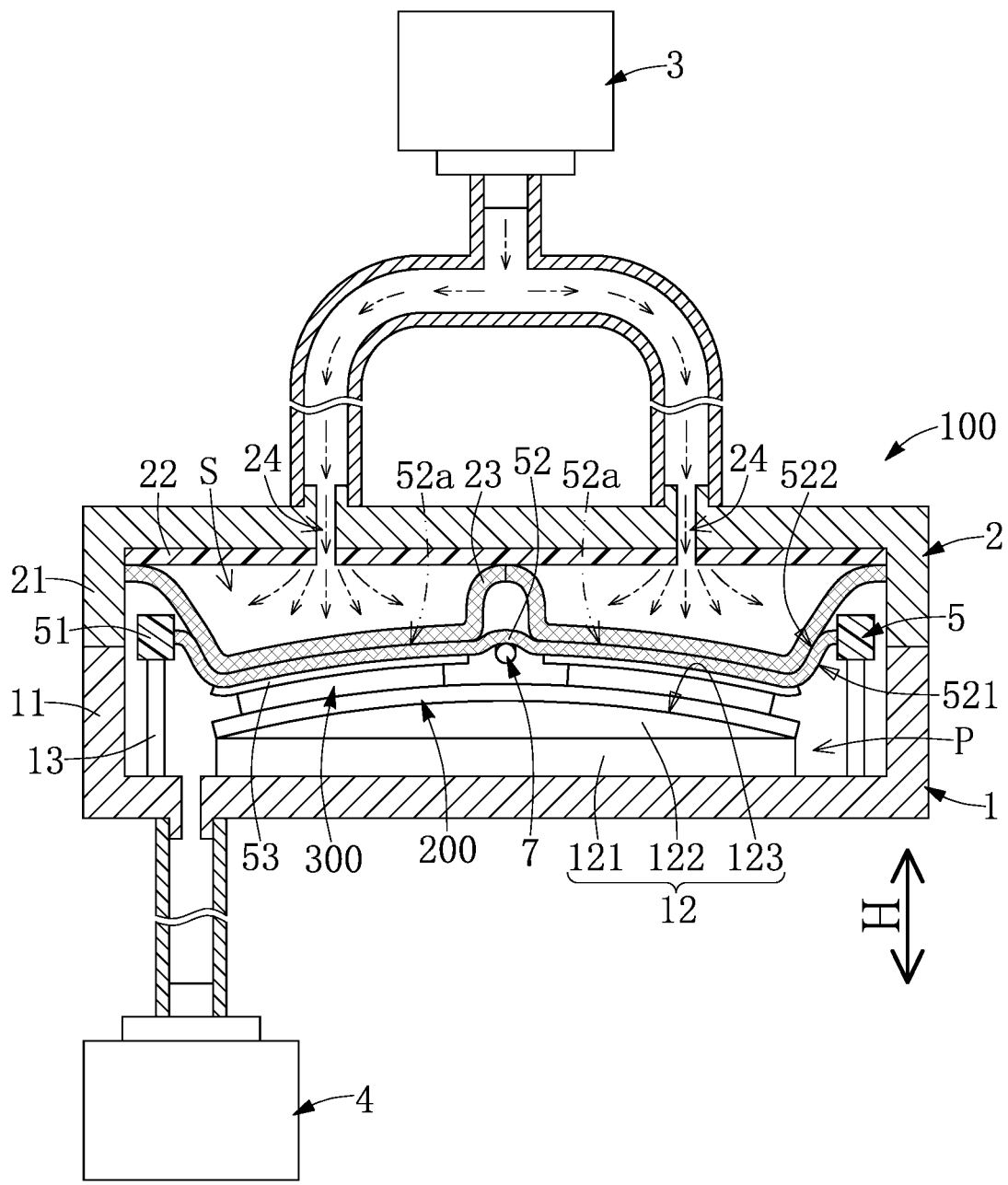
FIG. 18 is a second schematic view showing the attaching step of the attaching method that is implemented by using the attaching apparatus according to the second embodiment of the present disclosure.

As shown in FIG. 17 and FIG. 18, the attaching step is implemented by using the filling mechanism 3 to fill a fluid (e.g., gas or fluid) into the filled space S of the pressing mechanism 2 through the filling opening 24, so that the filled space S is gradually expanded toward the deformable sheet 52 to force the two pressing members 23 to gradually press the two regions 52a of the deformable sheets 52, respectively, and then the two regions 52a of the deformable sheet 52 are gradually deformed toward the carrying surface 123 to respectively press the two attaching object 300 onto the attached object 200. In addition, if the deformable sheet 52 is formed as the structure shown in FIG. 6 and FIG. 7 and is gradually pressed by the pressing member 23, a portion of the pressing member 23 presses the at least one attaching object 300 by passing through the at least one thru-hole 523. In one of the embodiments of the present disclosure, the number of the attaching objects 300 is N, the number of the recurving members 7 is 2(N−1), and when the deformable sheet 52 is gradually deformed toward the carrying mechanism 1, a portion of the deformable sheet 52 between any two of the regions 52a adjacent to each other is abutted against one of the pairs of the recurving members 7, so that the N number of the regions 52a are independently deformable to press the N number of the attaching objects 300 onto the attached object 200, respectively.

In addition, if any one of the regions 52a of the deformable sheet 52 is formed as the structure shown in FIG. 6 and FIG. 7 and are gradually pressed by the two pressing members 23, a portion of each of the two pressing members 23 presses the corresponding attaching object 300 by passing through the corresponding thru-hole 523.

Specifically, if an outer surface of the attached object 200 is in a curved shape, any one of the attaching objects 300 would be pressed (or clamped between) by the corresponding pressing member 23 and the attached object 200 to be deformed as a curved structure, thereby entirely attaching onto the outer surface of the attached object 200 (e.g., no bubble exists between any one of the attaching objects 300 and the attached object 200). Moreover, the two regions 52a of the deformable sheet 52 are gradually pressed by the two pressing members 23 to be slowly deformed, so that any one of the attaching objects 300 is also slowly deformed by the corresponding region 52a of the deformable sheet 52 for entirely attaching the attached object 200.

In the attaching step of the attaching method of the present embodiment, the recurving member 7 of the attaching apparatus 100 is provided to abut against a portion of the deformable sheet 52 between the two regions 52a, so that the two regions 52a can be ensured to independently deformable to press the two attaching objects 300 onto the attached object 200, respectively.

Figure 19:
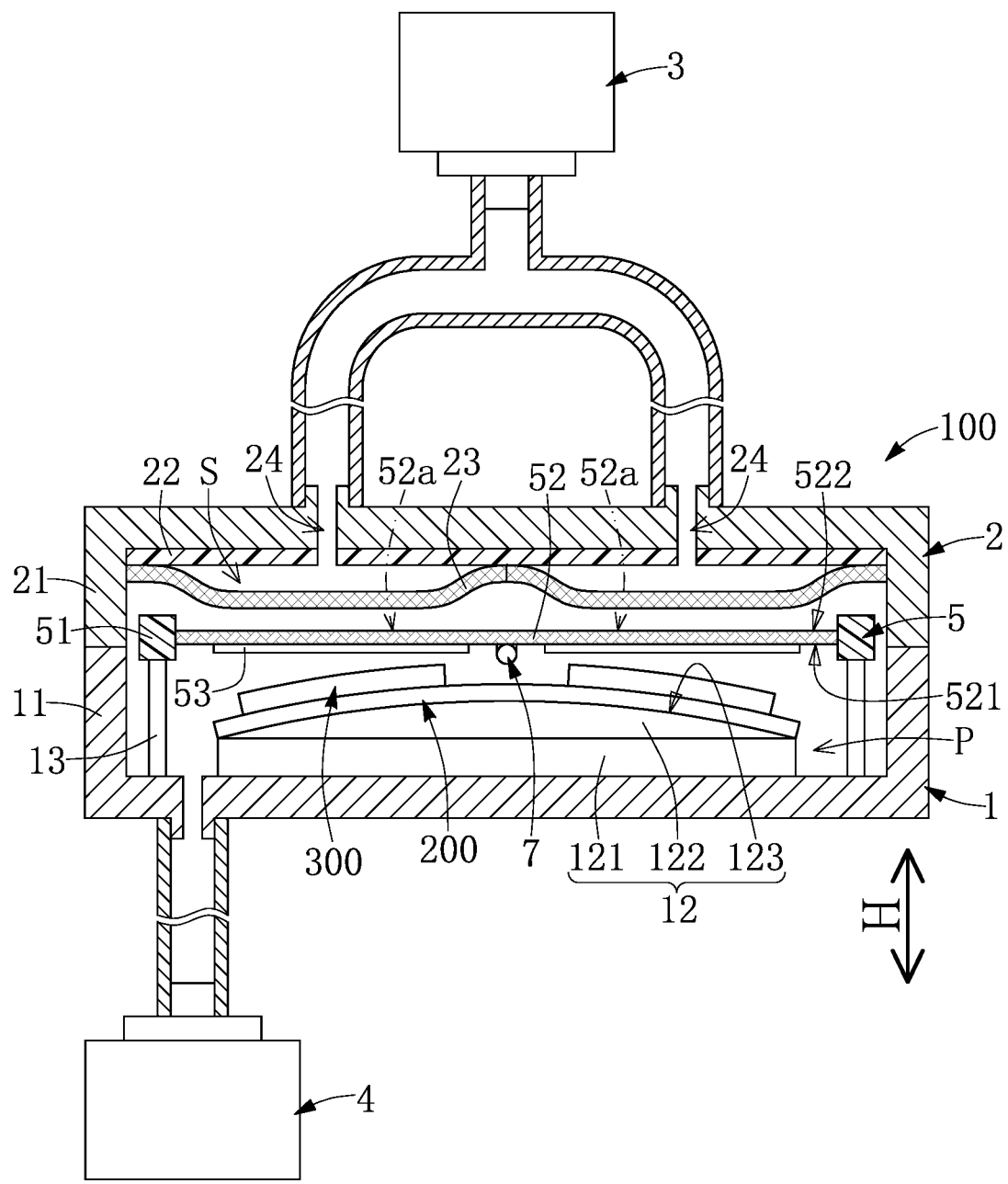
FIG. 19 is a schematic view showing a retrieving step of the attaching method that is implemented by using the attaching apparatus according to the second embodiment of the present disclosure.

As shown in FIG. 19, the retrieving step is implemented by using the filling mechanism 3 to expel the fluid from the filled space S through the filling opening 24 to stop the two pressing members 23 from pressing the deformable sheet 52, so that each of the attaching objects 300 separates from the adhesive layer 53 and is only adhered to the attached object 200. In the present embodiment, an adhesion force between the adhesive layer 53 and any one of the attaching objects 300 is less than an adhesion force between any one of the attaching objects 300 and the attached object 200, so that any one of the attaching objects 300 can be easily separated from the adhesive layer 53, but the present disclosure is not limited thereto.

In conclusion, the attaching apparatus and the attaching method of the present disclosure can be used to accurately attach the attaching object onto the attached object by using the intermediary mechanism to cooperate with the carrying mechanism and the pressing mechanism, thereby effectively preventing the attached object from being damaged. Moreover, the attaching apparatus and the attaching method of the present disclosure can be used to attach the attaching object onto the attached object in a flat connection or a curved connection.

In addition, the intermediary mechanism can further include a recurving member for increasing the attaching effect when a plurality of attaching objects are simultaneously attached onto an attached object.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An attaching apparatus, comprising:
a carrying mechanism including a carrying surface for fixing an attached object thereupon;
a pressing mechanism corresponding in position to the carrying mechanism, wherein the pressing mechanism defines a filled space arranged in an inner side thereof, and includes a filling opening in spatial communication with the filled space and a pressing member that defines at least part of the filled space, and wherein the pressing mechanism and the carrying mechanism are relatively movable between a seal position and an open position, and when the pressing mechanism and the carrying mechanism are at the seal position, the pressing mechanism and the carrying mechanism jointly define a work space; and
an intermediary mechanism selectively arranged between the carrying surface and the pressing member, and the intermediary mechanism including:
a frame fastened to one of the carrying mechanism and the pressing mechanism;
a deformable sheet fixed to the frame; and
an adhesive layer disposed on the deformable sheet, wherein the adhesive layer is configured to adhere at least one attaching object onto a side of the deformable sheet facing the carrying surface,
wherein, when the pressing mechanism and the carrying mechanism are at the seal position, the attached object is fixed on the carrying surface, and the at least one attaching object is adhered onto the deformable sheet, the filled space of the pressing mechanism is configured to be filled with a fluid through the filling opening, and the filled space is gradually expanded toward the deformable sheet to force the pressing member to gradually press the deformable sheet, so that the deformable sheet is gradually deformed toward the carrying surface to press the at least one attaching object onto the attached object;
wherein the deformable sheet has a first surface and a second surface that is opposite to the first surface, wherein the first surface faces the carrying surface, and the second surface faces the pressing member, and wherein the deformable sheet has at least one thru-hole penetratingly formed from the first surface to the second surface, the adhesive layer is disposed on the second surface, and a portion of the adhesive layer is arranged in the at least one thru-hole for adhering the at least one attaching object.

2. The attaching apparatus according to claim 1, wherein, when the pressing mechanism and the carrying mechanism are at the seal position, the pressing member is configured to be pressed by the filled space so as to be deformable in an expansion range, and wherein a portion of the deformable sheet corresponding in position to the adhesive layer is arranged in the expansion range.

3. The attaching apparatus according to claim 1, wherein, when the pressing member gradually presses the deformable sheet, a portion of the pressing member presses the at least one attaching object by passing through the at least one thru-hole.

4. The attaching apparatus according to claim 1, further comprising at least one recurving member fastened to at least one of the pressing mechanism, the carrying mechanism, and the intermediary mechanism, wherein the at least one recurving member is arranged at a side of the frame facing the carrying surface, the deformable sheet is divided into two regions by the at least one recurving member, and the two regions of the deformable sheet are respectively configured to fix two of the attaching objects thereupon through the adhesive layer, and wherein, when the deformable sheet is gradually deformed toward the carrying surface, a portion of the deformable sheet between the two regions is abutted against the at least one recurving member, so that the two regions are independently deformable.

5. The attaching apparatus according to claim 1, wherein the deformable sheet is resiliently deformable, so that after the pressing member stops pressing the deformable sheet, the deformable sheet tends to return to an original shape.

6. The attaching apparatus according to claim 1, wherein the carrying surface is a curved surface corresponding in shape to the attached object, and an adhesion force between the adhesive layer and the at least one attaching object is less than an adhesion force between the at least one attaching object and the attached object.

7. The attaching apparatus according to claim 1, further comprising a transferring mechanism arranged outside of the pressing mechanism and the carrying mechanism, wherein, when the pressing mechanism and the carrying mechanism are at the open position, the transferring mechanism is configured to hold the intermediary mechanism and to move the intermediary mechanism into or out of a space between the carrying surface and the pressing member.

8. The attaching apparatus according to claim 1, further comprising a suction mechanism connected to at least one of the pressing mechanism and the carrying mechanism, wherein, when the pressing mechanism and the carrying mechanism are at the seal position, the suction mechanism is configured to suction away air in the work space so as to allow the work space to be in a vacuum state.

9. An intermediary mechanism of an attaching apparatus for being selectively arranged between a pressing mechanism and a carrying mechanism, the intermediary mechanism comprising:
a frame for being fastened to one of the carrying mechanism and the pressing mechanism;
a deformable sheet fixed to the frame; and
an adhesive layer disposed on the deformable sheet, wherein the adhesive layer is configured to adhere at least one attaching object onto a side of the deformable sheet facing the carrying mechanism,
wherein the deformable sheet is configured to be pressed by the pressing mechanism, so that the deformable sheet is gradually deformable toward the carrying mechanism to press the at least one attaching object onto an attached object that is disposed on the carrying mechanism;
wherein the deformable sheet has a first surface and a second surface that is opposite to the first surface, and wherein the deformable sheet has at least one thru-hole penetratingly formed from the first surface to the second surface, the adhesive layer is disposed on the second surface, and a portion of the adhesive layer is arranged in the at least one thru-hole for adhering the at least one attaching object.

10. The intermediary mechanism according to claim 9, further comprising two recurving members movably fastened to the frame, wherein the two recurving members are movable to be arranged at a side of the frame, so that the deformable sheet is divided into two regions by the two recurving members, and the two regions of the deformable sheet are respectively configured to fix two of the attaching objects thereupon through the adhesive layer, and wherein, when the deformable sheet is gradually deformed toward the carrying mechanism, a portion of the deformable sheet between the two regions is abutted against the two recurving members, so that the two regions are independently deformable.

11. The intermediary mechanism according to claim 9, wherein the deformable sheet is resiliently deformable, so that after a pressing member stops pressing the deformable sheet, the deformable sheet tends to return to an original shape.

12. An attaching method using the attaching apparatus according to claim 1, the attaching method comprising:
  implementing a preparing step by disposing at least one attaching object onto the deformable sheet through the adhesive layer, and disposing an attached object onto the carrying surface of the carrying mechanism;
  implementing a placing step by disposing the intermediary mechanism between the pressing mechanism and the carrying mechanism that are both at the open position, wherein the frame of the intermediary mechanism is fastened to one of the carrying mechanism and the pressing mechanism, and the at least one attaching object faces the carrying surface of the carrying mechanism;
  implementing a sealing step by relatively moving the pressing mechanism and the carrying mechanism to the seal position, wherein the intermediary mechanism and the at least one attaching object are respectively arranged adjacent to the pressing member and the attached object; and
  implementing an attaching step by filling a fluid into the filled space of the pressing mechanism through the filling opening, so that the filled space is gradually expanded toward the deformable sheet to force the pressing member to gradually press the deformable sheet, and then the deformable sheet is gradually deformed toward the carrying surface to press the at least one attaching object onto the attached object.

13. The attaching method according to claim 12, wherein an adhesion force between the adhesive layer and the at least one attaching object is less than an adhesion force between the at least one attaching object and the attached object, wherein the attaching method further includes a retrieving step after the attaching step is implemented, and wherein the retrieving step is implemented by expelling the fluid from the filled space through the filling opening to stop the pressing member from pressing the deformable sheet, so that the at least one attaching object separates from the adhesive layer and is only adhered to the attached object.

14. The attaching method according to claim 12, wherein in the sealing step, a suction mechanism connected to at least one of the pressing mechanism and the carrying mechanism is configured to suction away air in the work space so as to allow the work space to be in a vacuum state.

15. The attaching method according to claim 12, wherein in the placing step, a transferring mechanism is arranged outside of the pressing mechanism and the carrying mechanism, and is configured to hold the intermediary mechanism and to move the intermediary mechanism into a space between the carrying surface and the pressing member by fastening the frame to one of the carrying mechanism and the pressing mechanism.

16. The attaching method according to claim 12, wherein in the attaching step, when the pressing member gradually presses the deformable sheet, a portion of the pressing member presses the at least one attaching object by passing through the at least one thru-hole.

17. The attaching method according to claim 12, wherein in the preparing step, the at least one attaching object is moved to a position correction platform, a position of the at least one attaching object is corrected by using an optical alignment unit to derive a relative position between the at least one attaching object on the position correction platform and the attached object, and then the at least one attaching object is fixed onto the deformable sheet through the adhesive layer.

18. The attaching method according to claim 12, wherein a number of the at least one attaching object is two, the intermediary mechanism further includes two recurving members fastened to the frame, the two recurving members are arranged at a side of the frame and are paired, the deformable sheet is divided into two regions by the two recurving members, and the two regions of the deformable sheet are respectively configured to fix the two attaching objects thereupon through the adhesive layer, and wherein in the attaching step, when the deformable sheet is gradually deformed toward the carrying mechanism, a portion of the deformable sheet between the two regions is abutted against the two recurving members, so that the two regions are independently deformable to press the two attaching objects onto the attached object, respectively.

19. The attaching method according to claim 18, wherein in the preparing step, the two attaching objects are respectively moved to two position correction platforms, a position of each of the two attaching objects is corrected by using at least one optical alignment unit to derive a relative position between each of the two attaching objects on the corresponding position correction platform and the attached object, and then each of the two attaching objects is fixed onto the deformable sheet through the adhesive layer.

20. The attaching method according to claim 12, wherein a number of the at least one attaching object is N, N is a positive integer more than one, the intermediary mechanism further includes 2(N−1) number of recurving members fastened to the frame, the 2(N−1) number of the recurving members are arranged at a side of the frame and are defined as a plurality of pairs, the deformable sheet is divided into N number of regions by the 2(N−1) number of the recurving members, and the N number of the regions of the deformable sheet are respectively configured to fix N number of attaching objects thereupon through the adhesive layer, and wherein in the attaching step, when the deformable sheet is gradually deformed toward the carrying mechanism, a portion of the deformable sheet between any two of the regions adjacent to each other is abutted against one of the pairs of the recurving members, so that the N number of the regions are independently deformable to press the N number of the attaching objects onto the attached object, respectively.

* * * * *